(12) United States Patent  
Ferrier

(10) Patent No.: US 9,974,410 B2  
(45) Date of Patent: May 22, 2018

(54) DEVICE FOR PREPARING BEVERAGES BY POD INFUSION HAVING A PIVOTING CRADLE

(71) Applicant: Technopool Sarl, LaTrinite (FR)

(72) Inventor: Christian Ferrier, Cantaron (FR)

(73) Assignee: Technopool Sarl (FR)

( * ) Notice: Subject to any disclaimer, the term of this patent is extended or adjusted under 35 U.S.C. 154(b) by 398 days.

(21) Appl. No.: 14/646,757

(22) PCT Filed: Sep. 18, 2013

(86) PCT No.: PCT/FR2013/052143  
§ 371 (c)(1),  
(2) Date: May 22, 2015

(87) PCT Pub. No.: WO2014/080097  
PCT Pub. Date: May 30, 2014

(65) Prior Publication Data  
US 2015/0297019 A1    Oct. 22, 2015

(30) Foreign Application Priority Data  
Nov. 23, 2012 (FR) .................................... 12 61196

(51) Int. Cl.  
*A47J 31/40* (2006.01)  
*A47J 31/36* (2006.01)

(52) U.S. Cl.  
CPC ......... *A47J 31/407* (2013.01); *A47J 31/3633* (2013.01); *A47J 31/3638* (2013.01)

(58) Field of Classification Search  
CPC ... A47J 31/407; A47J 31/3633; A47J 31/3638  
(Continued)

(56) References Cited

U.S. PATENT DOCUMENTS

| | | | |
|---|---|---|---|
| 4,253,385 A | | 3/1981 | Illy |
| 4,681,028 A | * | 7/1987 | Schmed .............. A47J 31/3609 99/289 R |

(Continued)

FOREIGN PATENT DOCUMENTS

| | | |
|---|---|---|
| EP | 1219217 A1 | 7/2002 |
| EP | 1859714 A1 | 11/2007 |

(Continued)

OTHER PUBLICATIONS

International Search Report for PCT/FR2013/052143 dated Nov. 13, 2013.

*Primary Examiner* — Thien S Tran  
(74) *Attorney, Agent, or Firm* — Caesar Rivise, PC

(57) ABSTRACT

The present invention relates to a device for preparing a flavored beverage and comprising:
- a first part or inlet head (1) and a second part or outlet head (2), and
- a third cradle-shaped part (3) delimiting an insertion compartment for a pod able to synchronously pivot with a relative translation of both first and second parts from an initial insertion position in which the cradle is in a tilted position as far as a final extraction position in which the cradle is in a vertical position, and said pod being compressed between both front faces (1-2) and (2-1) facing each other of said first and respectively second parts in a said extraction position.

16 Claims, 14 Drawing Sheets

(58) Field of Classification Search
USPC ..... 99/275, 279, 280, 282, 283, 289 R, 295; 426/77
See application file for complete search history.

(56) References Cited

U.S. PATENT DOCUMENTS

| | | | | |
|---|---|---|---|---|
| 5,454,293 A * | 10/1995 | Santi | ................... | A47J 31/0657 99/289 R |
| 5,755,149 A * | 5/1998 | Blanc | ................... | A47J 31/3623 99/289 T |
| 5,776,527 A | 7/1998 | Blanc | | |
| 6,490,966 B2 * | 12/2002 | Mariller | ............... | A47J 31/3633 99/289 R |
| 7,318,373 B2 * | 1/2008 | Blanc | ................... | A47J 31/3633 99/295 |
| 8,176,840 B2 * | 5/2012 | Jarisch | ................ | A47J 31/3633 99/289 R |
| 8,272,319 B2 * | 9/2012 | Jarisch | ................ | A47J 31/3633 99/289 R |
| 8,667,889 B2 * | 3/2014 | Blanchino | ............ | A47J 31/3633 99/289 R |
| 2002/0088348 A1 * | 7/2002 | Cortese | ................ | A47J 31/3633 99/295 |
| 2005/0235834 A1 * | 10/2005 | Blanc | ................... | A47J 31/3633 99/279 |
| 2009/0035438 A1 * | 2/2009 | Cortese | ................ | A47J 31/3633 426/590 |
| 2009/0308258 A1 * | 12/2009 | Boussemart | ........ | A47J 31/3633 99/295 |
| 2013/0305932 A1 * | 11/2013 | Epars | ................... | A47J 31/0668 99/295 |
| 2015/0050404 A1 * | 2/2015 | Ferrier | ................ | A47J 31/3633 426/425 |

FOREIGN PATENT DOCUMENTS

| | | |
|---|---|---|
| FR | 2424726 | 11/1979 |
| WO | 9517121 A1 | 6/1995 |
| WO | 2008012316 A2 | 1/2008 |
| WO | 2010149468 A1 | 12/2010 |

* cited by examiner

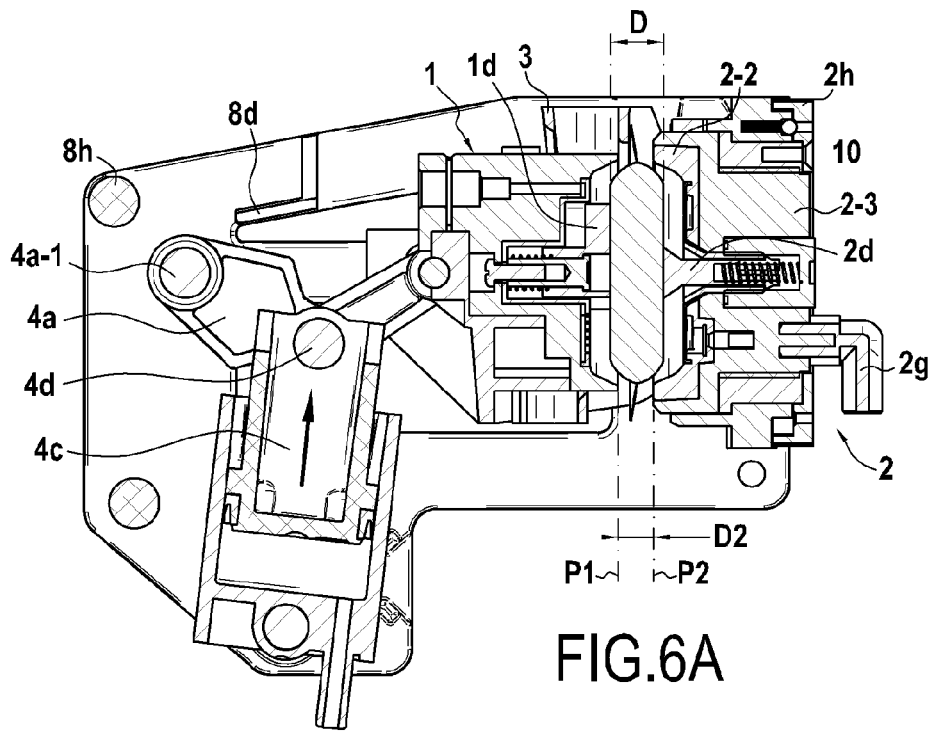
FIG.6A
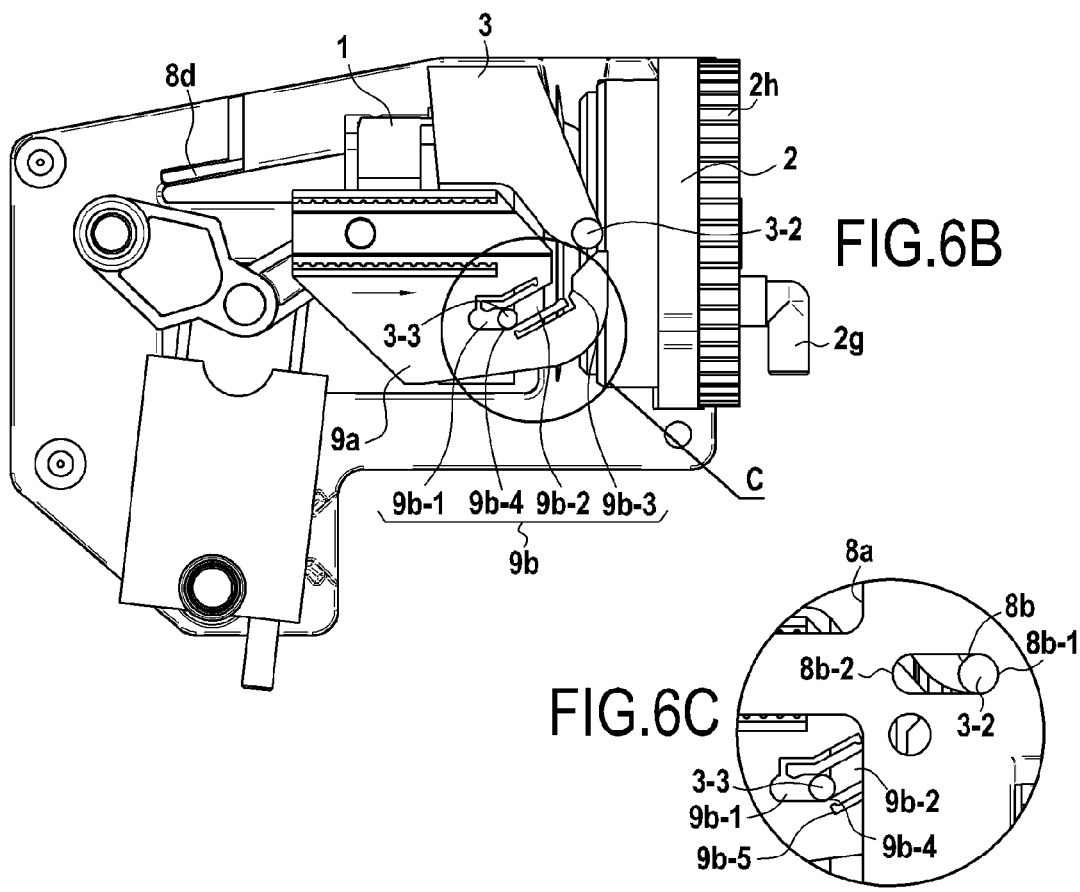
FIG.6B
FIG.6C

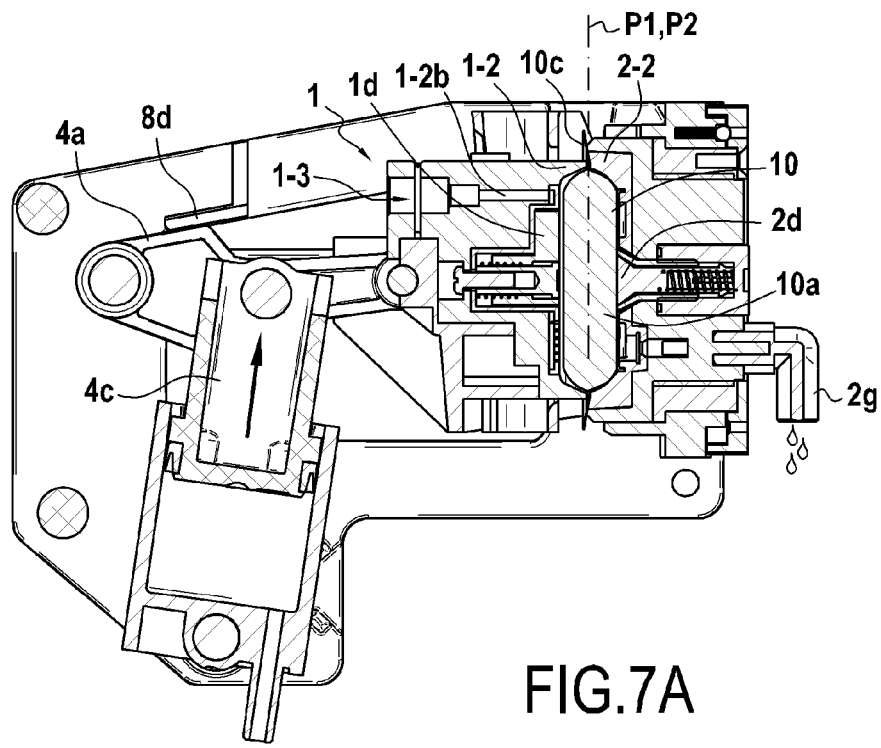
FIG.7A
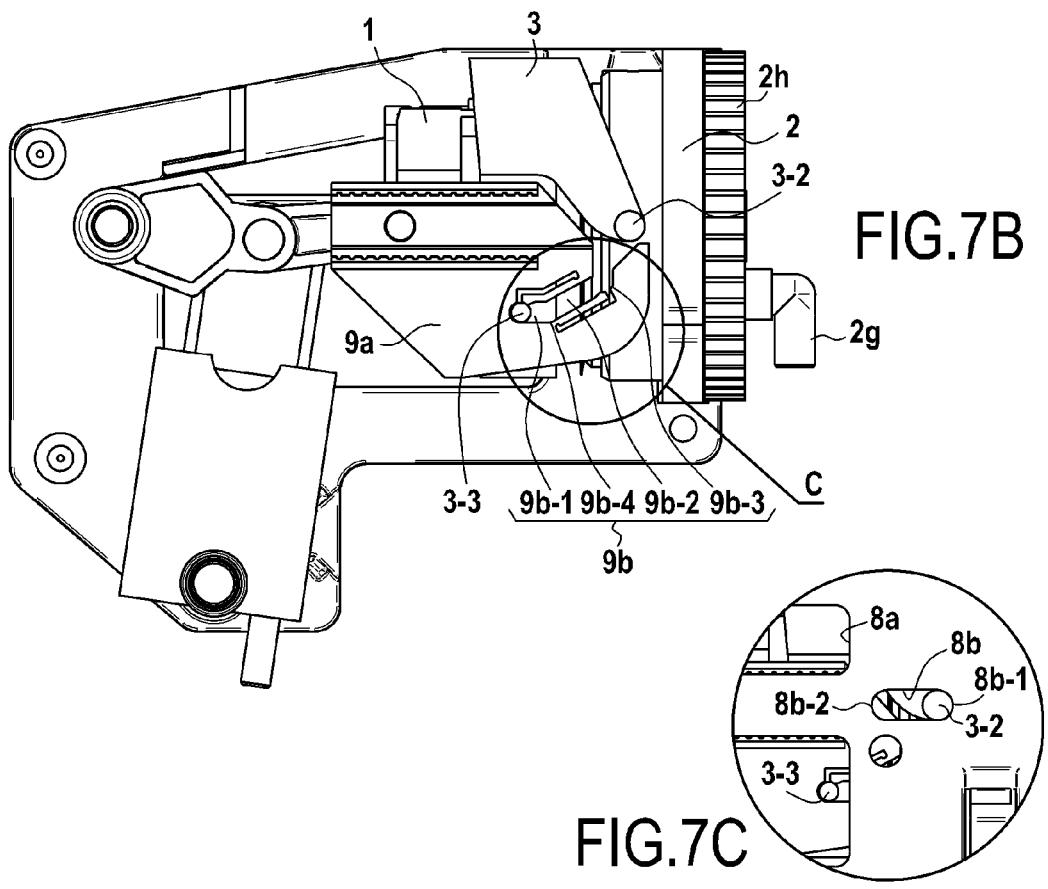
FIG.7B
FIG.7C

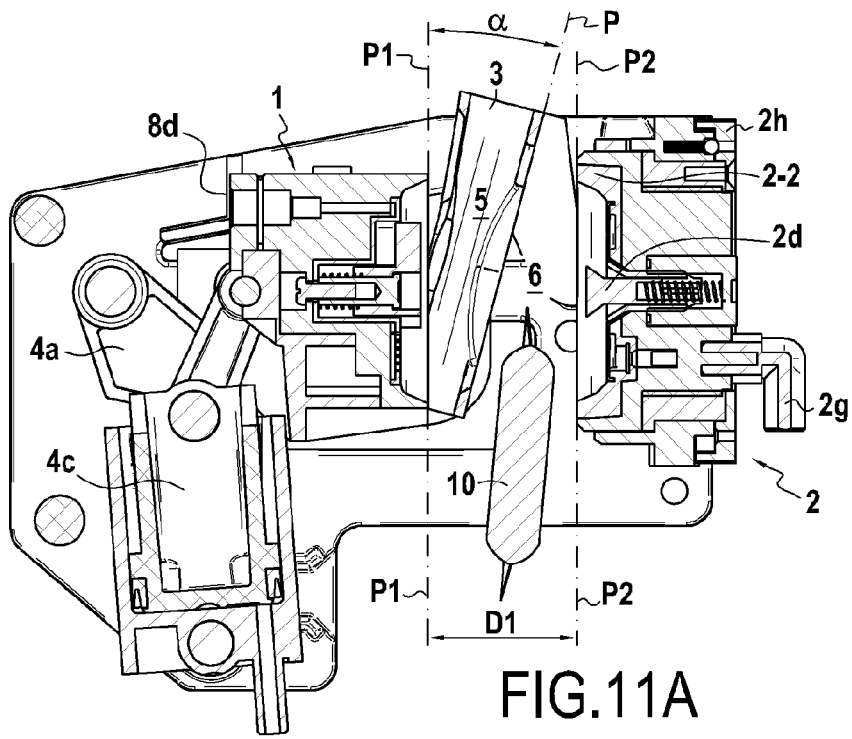
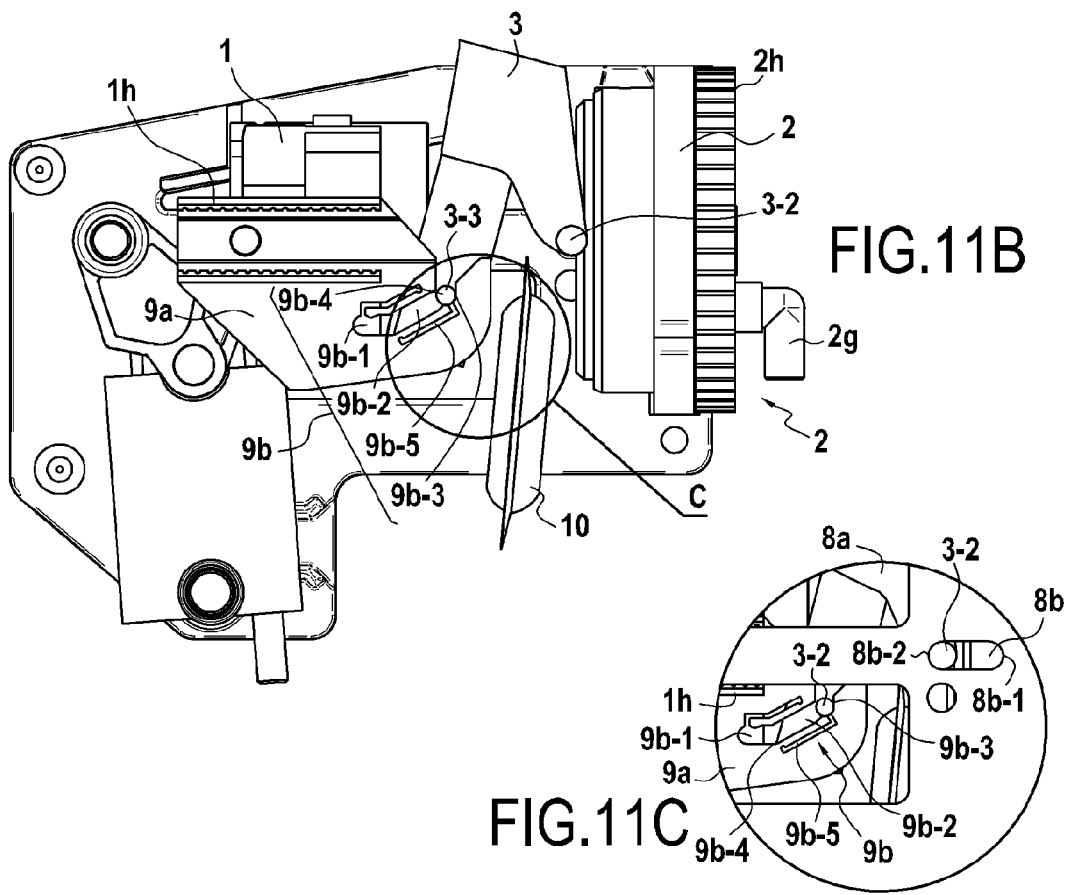
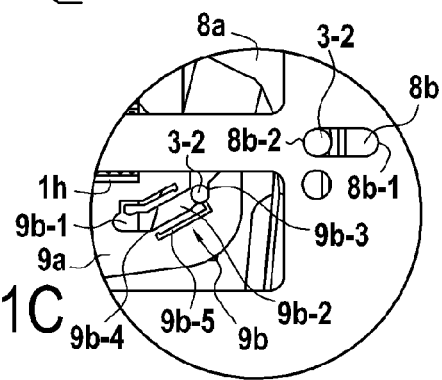
FIG.11A
FIG.11B
FIG.11C

DEVICE FOR PREPARING BEVERAGES BY POD INFUSION HAVING A PIVOTING CRADLE

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

BACKGROUND OF THE INVENTION

1. Field of the Invention

The present invention relates to a device for preparing a beverage by infusion of a pod of powder containing flavors to be extracted, through which a liquid, preferably water is injected.

More particularly, the present invention relates to a device of this type suitable for a pod having an ovoidal or flat pastille shape, said pastille may be surrounded by a peripheral flat flange with an essentially circular circumference extending in an axial plane with an essentially circular section of said pod. By "flat" or "ovoidal", is meant that the pod in a section perpendicular to said axial plane with a circular section, has two symmetrical faces with a flat or lenticular portion on either side of said axial plane. In a known way, said pod consists of two half-covers forming two half-shells connected together at their periphery in order to form said flange, said flange radially extending said cover and, preferably radially made in the same material, with the remainder of said cover.

More particularly, the present invention relates to a device for preparing beverages from pods of powder containing flavors, preferably a compacted powder, said pod comprising a cover, preferably in a porous or micro-perforated flexible material, preferably of the paper filter type, filled with said powder.

2. Description of Related Art

This type of pod is essentially used in traditional filter-holder coffee machines in which the pod is manually placed flat, horizontally, in a pod-holder, requiring manual withdrawal of the pod after use. Pods and devices of this type are notably described in FR 2 424 726.

Semi-automatic machines are known in which the discharge of the pod is accomplished without any manual intervention from the user because inter alia, the pod is introduced into the machine in the vertical direction allowing its discharge by gravity.

However, in the machines described in the prior art, notably in EP 1 859 714, it is necessary to apply a pod with a stiffened flange, notably a cardboard flange, and more generally a pod, the cover of which is relatively stiff requiring said cover to be pierced in order to be able to extract the flavors contained inside the pod by injecting liquid through the pod.

More particularly, in EP 1 859 714, the device comprises:
a first part forming a piston, and
a second part comprising at its end an extraction and discharge compartment, open in the lower portion, adjacent to an insertion compartment open in the upper portion, and able to retain the pod with its lower portion, and
means for displacement in horizontal relative translation coaxial with said first and second parts, such that said first part crosses a side aperture on the front face of the insertion compartment and transfers the pod into the adjacent extraction and discharge compartment. During its transfer between both compartments, the pod is retained by pins on the surface of the piston piercing through its cover wall. And then, once it is in the adjacent extraction compartment, the pod is retained by clamping its flange between the first part and a peripheral side edge of the discharge and extraction compartment forming the front face of the second part. It is the clamping of the flange which ensures the seal between both first and second parts in an extraction chamber confining the extraction and discharge compartment into which the liquid is injected through the pod, the wall of which having been pierced by said pins.

The device described in EP 1 859 714 is, however, not suitable for application when the cover and the flange of the pod are made in paper since the flange and the wall of the pod have to have some strength and rigidity so as not to be torn and to prevent the fall of the pod when its flange is clamped, in spite of the weight of the pod, when the latter is not retained in a lower portion like this is the case in the discharge compartment.

Finally, if the pod is not retained by elements for piercing its wall during its transfer between both compartments, it is not prevented from falling by gravity when it arrives in the discharge compartment before the final clamping of the flange in the discharge compartment.

Such mechanical properties are not necessarily satisfied with a porous paper flange of low basis weight, such as 12 to 50 g/m$^2$, as this is the case in traditional liquid-pervious paper pods.

In practice, EP 1 859 714 is specially adapted for pods with rigid capsules, the wall of which has to be pierced on the one hand and for which the flange at least has some stiffness on the other hand in order to rapidly resume its position after folding, once the folding stress is ended, and for supporting clamping without causing tearing once it is in the discharge compartment.

In U.S. Pat. No. 5,776,527, a device is also described capable of receiving a pod vertically and allowing its semi-automatic discharge by gravity without manual intervention from the user. However, in such a case, the pod is maintained vertical between two elements forming grooves.

These elements are laterally positioned on each side of the pod and slightly tilted so that they retain and support the flange of the pod. And, by side pivoting of both elements around an axis parallel to the common longitudinal axis of both parts, it is possible to release and eject by gravity the pod after extracting the flavors which it contains. However, additional means for pivoting the elements for retaining the pod should be applied. Further, in U.S. Pat. No. 5,776,527, there again the sealing of the extraction chamber requires clamping of the flange over the whole of its periphery. This device thus requires the application of a pod with at least one relatively stiff flange, i.e. in practice a cardboard flange, further, the device of U.S. Pat. No. 5,776,527 not comprising any internal ejector, the flange may remain stuck in the device if the cardboard making it up is not softened in an excessive way, thereby perturbing the discharge of the pod.

Still other machines are known able to receive a pod in the vertical position applying systems for discharging the pod by pivoting the head for the outflow of the liquid as a whole, such as described in EP 1 219 217.

Such a machine is complex and expensive to make insofar that the only applied translational means for compression and confinement of the pod in an extraction chamber are insufficient for allowing the discharge of the pod after extraction, the application of additional oscillation means being required.

In WO 2010/149468, a device is described for preparing a flavored beverage, notably based on coffee flavors, able to extract flavors by infusion of a powder pod containing them, said device comprising:
- a first male part comprising at least one cylindrical portion forming a piston, and
- a second female part comprising a body delimiting an internal chamber with a cylindrical wall of the same longitudinal axis (XX') as said piston, said second female part comprising, in the front of said internal cylindrical chamber, an insertion compartment forming a cradle able to receive said pod with its flange in a position parallel to the plane of the front aperture of said chamber, and
- first means for displacement in relative rotation and coaxial horizontal relative translation XX' of said first male part and second female part, the assembly of said second part and of said cradle being initially tilted upwards, before pivoting downwards and then being displaced in relative translation with respect to said first male part passing through the side aperture of said cradle for compressing said pod at the bottom of said chamber in order to obtain a sealed closing position in which the cylindrical portion of said first male part is located inside said internal chamber, delimiting a sealed compartment, called an extraction chamber, inside said internal chamber, in which said pastille is able to be compressed.

This device is relatively complex since it requires means for pivoting the assembly of the second female part and of said cradle, of a second female part with an internal chamber and means for translating the first male part inside said internal chamber as well as translational means combined with an ejector at the bottom of the chamber in order to allow exit of said pod after extraction at the bottom of said chamber.

On the other hand, in WO 2010/149468, the bottom of the cradle for storing the pod, in the portion supporting the lower portion of the flange, only retains the flange locally in two points, by retaining means 33 positioned symmetrically and not on the whole of its lower periphery. The result of this is that in the device according to WO 2010/149468, the pod is not always perfectly maintained in a coaxial position with respect to the cylinder and to the piston, notably when the flange of the pod collapses and/or when the diameter of the flange varies from one dose to the other. Indeed, in both cases, there may be decentering of the pod with respect to the coaxial axis of the piston and of the cylinder.

In WO 2010/149468, the bottom of the groove of the cradle supports the peripheral edge of the flange on its lower half-circumference, which does not give the possibility of avoiding collapse of the flange in its insertion compartment, because of its flexibility, and therefore does not maintain it in a suitable position centered with respect to the axis of said first male part and second female part, so that the folded flange does not properly fit into its housing between the piston and the chamber in the closing position. More specifically, when the diameter of the flange is slightly greater than that provided initially in the configuration of the cradle, there occurs a slight decentering of the pod with respect to the axis of the cylinder and of the piston, so that jams may occur, either initially during the compression or during the discharge. In patent WO 2010/149468, this problem is enhanced because the cradle does not include a solid lower bottom.

BRIEF SUMMARY OF THE INVENTION

The object of the present invention consists in a simpler and more reliable improved device in its operation.

Another object of the present invention is to provide a device of this type which is particularly suitable for being applied with pods, the flange and the cover wall of which are made in a porous or micro-perforated flexible material with low basis weight, notably from 12 to 50 g/m², preferably of the paper filter type.

To do this, the present invention provides a device for preparing a flavored beverage, notably based on coffee flavors, able to extract flavors by infusion of a powder pod containing them, said pod having a shape of a flat or ovoidal pastille, filled with said powder, said device being able to extract the flavors contained in said powder when said pod is crossed by a liquid, preferably pressurized water, in an extraction chamber, said device comprising:
- a first part comprising a front cylindrical portion comprising a front face comprising a first front surface for peripheral support, surrounding a first front non-cylindrical axisymmetrical surface of revolution, and
- a second part comprising a front cylindrical portion of the same axial longitudinal axis (XX') as the front cylindrical portion of said first part, comprising a front face positioned facing the front face of the first part, comprising a second front surface for peripheral support surrounding a second front non-cylindrical axisymmetrical surface of revolution, and
- a third pivotally mounted part able to pivot with respect to an axis extending in a transverse direction (YY') perpendicular to said longitudinal axis (XX'), said third part being able to pivot in a synchronized manner with relative translation of both first and second parts, said third part comprising an orifice, preferably at least partly circular, in a plane P extending in a said transverse direction (YY'), able to be crossed by said cylindrical front portion of said first part when said plane P of said orifice of said third part is in the vertical position, and means for coaxial horizontal relative translational displacement (XX') of said first part and second part and synchronized pivoting of said third part, between:
an initial opening and insertion position in which said first and second parts are the furthest away in translation, said third part being located in a tilted position between said first and second parts, the plane (P) of said orifice being in a position of maximum tilt, preferably with an angle ($\alpha$) from 10 to 30°, with respect to a transverse vertical plane (YZ) perpendicular to said longitudinal axis (XX'), said third part in a maximum tilt position delimiting with the front face of said first part an insertion compartment able to receive and support said pod, the latter being inserted by gravity into said open insertion compartment in the upper portion, and
a position for closing or for maximum approach in relative translation of both first and second parts wherein said first and second peripheral surfaces supporting said front faces of said first and second part are bearing against each other, said front face of said first part and front face of said second part delimiting a sealed compartment, called an extraction chamber, inside which said pastille is able to be compressed in order to achieve a said extraction, the plane P of said orifice being in the vertical position and crossed by at least said cylindrical front portion of said first part in said closing position, and
a position for reopening and discharging by translationally moving away both first and second parts from each other delimiting a discharging compartment, said discharging compartment being able to receive said pod, said pod may be discharged by gravity after a said extraction outside said open discharging compartment in the lower portion.

By "front" or "rear" of the first part and of the elements which are secured to it such as the cradle, said pod and said chassis described hereafter, are meant positions relatively to the translational displacement from the "rear" to the "front" during said translation from an opening position towards a closing position in the axial longitudinal direction XX', and a displacement from the "rear" to the "front" during the translation from a said closing position to a said position for reopening and discharging. Conversely, by "front" or "rear" of the second part are meant relative positions in the axial longitudinal direction XX', the "front" being closer to the first part and the "rear" being further away from the first part, the insertion compartment being immediately located at the front of said first part and the discharging compartment being immediately at the "front" of said second part.

It is also understood that:
the covered upper portion of said insertion compartment and the open lower portion of said discharging compartment have in both longitudinal XX' and transverse YY' directions, greater dimensions than those of said pod, so as to allow its insertion into said insertion compartment and its discharge from said discharging compartment, and
said insertion compartment has in its lower portion, a less wide lower aperture in said axial longitudinal direction XX' than the width of said pastille into which said flange is inserted without being folded so that the pod remains in said insertion compartment, in said tilted position of the cradle.

It is understood that when said pod is in a position in said extraction chamber, said pastille comprises two opposite front and rear faces, flat and vertical in section, in a longitudinal axial plane of the device and preferably has a circular section in section in a transverse axial plane of the pod, perpendicular to said longitudinal axial direction of the device.

It is understood that said third part is able to pivot in a synchronized manner between a maximum tilt position and a vertical position:
from a maximum tilt position in said opening position as far as a vertical position in said closing position with the plane of said orifice in a vertical position, during said translation from an opening position as far as a said closing position, said orifice being crossed by said cylindrical front portion of said first part and said pod being able to cross said orifice of said third part under the effect of the relative translation of said first part through said orifice of said third part, during said translation from an opening position as far as a said closing position as soon as the plane of said orifice is in a vertical position, and then
from a said closing position with the plane of said orifice in a vertical position as far as a maximum tilt position during said translation from a closing position as far as a said initial opening position.

The pivoting of the third part with maximum tilt in said initial opening position is required for retaining and supporting the lower portion of the pod in the insertion compartment between the front face of the first part and the rear face of the third part while the pivoting in a vertical position is required for allowing the first part to pass through said orifice of the third part so that the front face of the first part will abut against the front face of the second part and produce said extraction chamber.

It is understood that:
said third part has an identical tilt in the position for inserting the pod and in the position for ejecting the pod, and the rotation of said third part is accomplished automatically concomitantly with the relative translational displacement of said first and second parts, and
the displacement of said third part comprises a step in which the orifice of said third part is crossed by said first or second part after having been crossed by said solid pastille-shaped portion of said pod, and
said flange of the pod is able to be folded when said pod crosses said orifice under the effect of the relative translation of said first part.

Said third part may be mounted on a common chassis supporting the three parts or being secured to one of both first and second parts.

In a preferred embodiment, said device includes:
a—a said first part able to be displaced in translation by means of said relative translation displacement means, and
b—a said second part which is not able to be displaced in translation by means of said relative translation displacement means, and
c—a said third part pivotally mounted on a common chassis supporting the three parts, said first part being guided in relative translation by first guiding means secured to said chassis, said third part comprising guiding and pivoting elements, cooperating with additional guiding elements secured to said first part and said chassis, so that said relative translation of the first part on a portion of its travel causes said pivoting of said third part.

More particularly, said third part is guided in rotation by guiding elements secured to said third part and displaced along additional guiding elements forming a guiding path such as a not entirely horizontal grooved path i.e. including at least one portion which does not extend in the axial horizontal direction for relative translation of said first and second parts, said additional guiding elements being secured to said chassis and giving the possibility of guiding and of controlling the translation and the pivoting of said third part when said first and second parts are displaced in relative translation. Still more particularly, said male pivoting guiding elements of said third part cooperate with said additional female guiding elements with a grooved shape, secured to said first part and said chassis so that said relative translation of the first part over a portion of its travel causes translation of said third part simultaneously with the translation of said first part but without pivoting said third part so that during the reopening of said device, said third part is driven in translation with said first part, said third part remaining with the plane P of its said orifice in a vertical position until the space between the said first part and said second part is greater than the thickness of said pastille.

Still more particularly, said orifice of said third part is delimited by a rear peripheral surface of said third part facing said first part in said initial opening position, preferably a rear at least partly frusto-conical peripheral surface, able to support at least in its lower frusto-conical portion, the convex peripheral portion of the pastille filled with powder of said pod on a front face of the pod, the upper portion of said rear peripheral surface delimiting said orifice supporting the upper portion of the flange, the rear face of the same convex peripheral portion of the pastille-shaped solid portion of said pod in a tilted position in said insertion compartment bearing against a lower portion of said first front non-cylindrical axisymmetrical surface, preferably frusto-conical surface, of said first part.

According to other particular features:

said first part comprises a front portion with a cylindrical external surface with an axial longitudinal axis (XX'), the front face of which forms a first front peripheral supporting surface, preferably vertical, surrounding a first front non-cylindrical axisymmetrical surface, preferably frusto-conical surface, said first front non-cylindrical axisymmetrical surface surrounding a first set-back internal central surface, said first central surface preferably being further perforated or covered with a first perforated plate so as to distribute the arrival of pressurized water injected through said first central surface towards said extraction chamber, and said second part comprises a front portion with a cylindrical external surface with a same axial longitudinal axis (XX'), the front face of which forms a second front peripheral supporting surface surrounding a second front non-cylindrical axisymmetrical surface, preferably a frusto-conical surface, said second front non-cylindrical axisymmetrical surface surrounding a second set-back internal central surface, said second central surface being preferably perforated or covered with a second perforated plate able to filter the liquid after said extraction and before its discharge through said second part.

More particularly, said first and second front frusto-conical axisymmetrical surfaces surrounding said first and respectively second central surface, have increasing diameters from said first and respectively second central surfaces as far as said first and respectively second front peripheral supporting surfaces.

It is understood that said first and second internal central surfaces and said first and second front peripheral non-cylindrical axisymmetrical surfaces form surfaces bearing against the solid portion of the pod, said internal central surfaces bearing against the central portions of the front and rear side faces of the pastille of said pod, and said first and second front peripheral non-cylindrical surfaces bearing against the whole perimeter of the convex peripheral portions of the solid portion with a pastille shape of the pod, when said pod is compressed in said extraction chamber in said closing position.

Said front supporting surfaces of the front faces of the first and second parts have a circular cross-section in a transverse plane perpendicular to the longitudinal axial direction XX', with a ring shape.

The frusto-conical shape of said first and second peripheral front axisymmetrical surfaces is particularly advantageous for detaching and disengaging the pod, from said central supporting surfaces under the effect of the extension of said first and second ejectors described hereafter, and for allowing discharge by gravity of said pod, upon returning to a said opening position from a said closing position. Indeed, these frusto-conical surfaces limit contact surfaces with the convex peripheral portions of the pastille.

The perforations of the second perforated plate allow filtration and passing of the pressurized liquid loaded with flavors after having crossed the pod in the extraction chamber, and then discharge of the liquid through a discharge conduit.

In a preferred embodiment, the volume of the extraction chamber in the said closing position is adjustable by adjusting the progression of said front portion (2-2) of the second part in said longitudinal direction (XX') with a thumb wheel, independently of said relative translation of said first part by means of said translation displacement means.

This feature is particularly advantageous since it gives the possibility of adjusting at will the extraction quality of the coffee by modifying the compression of the pod in the extraction chamber according to the grade and density of the ground coffee inside the pod and according to the sought flavor concentration after extraction. If the pod and the coffee which it contains are more compressed in the extraction chamber, the time for the liquid to flow through the pod is slowed down and the liquid obtained after extraction will be more concentrated in flavor.

Still preferably, said front portion of said second part comprises at least one portion in a compressible material, preferably in an elastomeric material, still preferably in silicone, at least in said front portion defining said second front surface for peripheral support, said front non-cylindrical axisymmetrical surface, and preferably at least one peripheral portion of said second set-back central surface.

This feature is advantageous for achieving an optimum seal between both said first and front supporting surfaces in said closing position without adding an additional seal gasket, and this feature further gives the possibility of not tearing the flange clamped between said first and second front supporting surfaces. Alternatively, if both said first and second front supporting surfaces are in a rigid material, they should comprise or cooperate with a deformable seal gasket.

This feature is further advantageous when the adjustment of said thumb wheel displaces in longitudinal translation said front portion in compressible material of the second part and the compressibility of said compressible material is such that, when said first part is in translation for maximum approach with respect to said second part, in said closing position, the compression of said compressible material allows a progression of said second part by adjustment of said thumb wheel.

According to other particular features:

said first set-back internal central surface comprises or cooperates with a first ejector comprising first supporting elements, said first ejector being mounted on a first elastic return means exerting a thrust on said first ejector such that said first supporting elements of the first ejector are able to be maintained in front of said first central surface by said first elastic return means in said opening position and said first supporting elements of the first ejector are able to be brought back at said first set-back central surface when they are bearing against the pod in said closing position, and said first set-back internal central surface cooperates with a first ejector comprising first supporting elements, said first ejector being mounted on a first elastic return means exerting a thrust on said first ejector such that said first supporting elements of the first ejector are able to be maintained in front of said first central surface by said first elastic return means in said opening position and said first supporting elements of the first ejector are able to be brought back at said first set-back central surface when they are bearing against the pod, in said closing position, said second set-back internal central surface comprises or cooperates with a second ejector comprising second supporting elements, said second ejector being mounted on second elastic return means exerting a thrust on said second ejector such that said second supporting elements of the second ejector are able to be maintained in front of said second central surface by said second elastic return means in said opening position and said second supporting elements of the second ejector are able to be brought back at said second set-back central surface when they are bearing against the pod, in a said closing position, and said second ejector comprises a front portion in an elastomeric material, preferably in silicone, mounted on a rigid rod able to cooperate with said second elastic return means, said front portion of the second ejector comprising a head forming said second supporting elements in elastomeric material, the rear face of which is of a frusta-conical shape able to sealably close the central aperture of said front portion of said second part when said second ejector slides therein as far as into said withdrawal position, and said rear face of the front portion of the second ejector comprises junction means ensuring the junction between said second supporting elements with the rear face of said front portion of said second part, said junction means in an elastomeric material being able to sealably close the central aperture of said front portion of said second part of said second ejector when said second ejector slides therein as far as into said extension position, said first and second supporting elements of said first and second ejectors being in front of said first and respectively second central surface of the front faces of the first and respectively second parts under the effect of said first and respective second return means, are able to bear against the two front and rear faces of the pod and maintaining it vertical by preventing the fall of the pod, during the intermediate phases for relative translation of said first and second parts upon closing the device before arriving in said closing position and during the initial phase for reopening before its discharge into said discharging compartment when the distance between said first and second ejector is less than the thickness of said pastille, and the surfaces of only one of said first and second supporting elements able to come into contact against both opposite faces of the pod, does not prevent the fall of the pod by gravity when both first and second parts are sufficiently moved away by said relative translation in order to form a said discharging compartment.

It is understood that:

the surfaces of said first and second supporting elements able to come into contact against both opposite faces of said pod are insufficient for having the pod remain applied by adhesion, and in a said opening position, said first supporting elements may be partly in contact with the pod but do not bear against the pod, and in a said closing position, said first and second return means are compressed.

Still more particularly, said first supporting elements are upper and lower branches extending radially arranged angularly according to a shape and arrangement, preferably one middle upper branch and two side lower branches positioned at 120° with respect to the upper branch, such that:

in said opening position, upon inserting said pod into said insertion compartment, said pod will first of all only abut against said upper branch without coming into contact with said lower branches, said upper branch guiding the fall of the pod against said rear peripheral surface of said third part, and in said opening position, when the front face of the convex peripheral portion of the pastille filled with powder of said pod, is bearing against said rear peripheral surface of said third part, in a tilted position in said insertion compartment, the rear face of said pod is in contact with the lower portion of said non-cylindrical peripheral surface of the front face of said first part but without any contact with either said upper branch or said lower branches.

Still more particularly, in said insertion position, said insertion compartment comprises an open space forming a slot between the lower portion of the rear face of said cradle and the lower portion of the front face of said first part, said slot being able to be crossed by a flange of the pod, when the pod is inserted into said insertion compartment.

This embodiment is particularly advantageous when said pod comprises a said pastille surrounded by a peripheral flat flange extending in a transverse axial plane of said pastille, said flange being able to be folded with respect to said axial plane when said pod crosses said orifice of said third part, said pod preferably having an essentially circular section in said axial plane, and said flange being able to be clamped between said front peripheral supporting surfaces of said first and second parts bearing against each other in said closing position.

Still more particularly, said cradle forms a ring, the orifice of which is delimited by a peripheral rear surface, the upper portion of which has an oblong half circumference able to continuously support the upper portion of said flange and the lower portion of which has a semicircular lower half circumference able to continuously support the lower portion of the front face of the convex solid portion of said pastille when said pod is in the insertion compartment in said opening position, said orifice being bordered by two side edges able to laterally maintain said flange coaxially with said longitudinal axis (XX') at least between said upper and lower portion of said peripheral rear surface delimiting said orifice.

Still more particularly, said relative translation means are able to displace said first movable part with respect to a said second part, said first part being attached to a chassis, said chassis ensuring the longitudinal relative translational coaxial guiding of the first movable part with respect to said second fixed part and the relative translation and rotation guidance of said third part, and said relative translational means comprise a system of connecting rods which may be actuated manually by a lever or by a motor preferably through an actuator, said connecting rod system ensuring the cinematic translation link of said first part with respect to said chassis.

It is understood that:
said insertion compartment has in its lower portion, a lower aperture or slot between the lower portion of the cradle and the lower portion of the front face of the first part, less wide in said axial longitudinal direction XX' than the width of said pastille in which said flange is inserted without being folded so that the pod remains in said insertion compartment, in said tilted position of the cradle.

Said pod is supported in the sub face of the lower portion of the convex peripheral portion of the solid pastille-shaped portion of said pod on both of its faces when the latter is inserted into said insertion compartment, the lower portion of said cradle in a tilted position reaches a height substantially at the same level as the lower portion of the front face of the first part; and by rotation in a vertical position, the lower portion of the cradle is cleared below said first part so as to allow the latter to be able to cross the orifice of said cradle.

The flexible peripheral edge of the flange of the pod is folded at 90° upon its passing through the orifice of the third part and is replaced vertically before confining said pastille in the extraction chamber by relative translation of both first and second parts. On the other hand, said flange may extend locally with a radial extension forming a tab.

The device according to the present invention is advantageous in that it allows application of an ordinary pod comprising a cover in a porous or micro-perforated flexible material and therefore relatively fragile once it is wet, preferably of the paper filter type without requiring that the flange be in reinforced cardboard.

By "flat or ovoidal" is meant that the pod has two symmetrical faces with a flat or lenticular portion on either side of its diametrical plane, which is also the plane of the flange.

More particularly, the pod consists of two half-covers forming two half-shells joined together at their periphery, notably adhered against each other, in order to form said flange, said flange radially extending said cover and preferably, made in the same material and with the remainder of said cover.

The external diameter of said first part is slightly less than the diameter or dimensions of the orifice of said cradle, so that it may cross it. On the other hand, the internal diameter of said orifice is slightly greater than that of the pastille-shaped powder solid portion of the pod, and less than the maximum diameter of the flange, so that in the case of relative translation of the first part from said opening position to said closing position, said flange is transiently folded.

Still more particularly, when the relative translation means comprise a lever located above said first female part and a system of connecting rods, a system of belts and pulleys or gears ensures transmission of the rotary movement of the lever to the system of connecting rods.

The present invention also provides a method for using a device according to the invention, characterized in that the following successive steps are carried out:

1—a said pod in a tilted position is inserted by gravity in a said insertion compartment, said first part and said second part being in said open and insertion position, one face of the pod in the convex periphery of the pastille-shaped solid portion of said pod bearing upon the lower portion of said rear surface of said third tilted part (a), the other face of the pod in the convex periphery of the pastille-shaped solid portion of said pod, bearing against a lower portion of said front non-cylindrical axisymmetrical surface of the front face of said first part, and then 2—a relative translation for bringing closer together both said first part and second part and a translation and rotation of said third part from said insertion position as far as a said closing position during which the orifice of said third part in said vertical position is crossed by said pod, and then by said first part, until said pod is compressed in a said sealed extraction chamber, is performed, and then 3—an injection of liquid is carried out from said first part in said extraction chamber and through said pod, and then discharge of said liquid from said extraction chamber through said second part, and 4—a relative translation for moving away both of said first part and second part from each other is carried out from said closing position as far as a said reopening and discharging position, said third part in a vertical position being displaced in translation and then in rotation in said tilted position, said pod being displaced in a said discharging compartment from which the pod is discharged by gravity.

More particularly, in step 4, the discharging compartment is delimited by a separation of two ejectors of both first and second parts by a distance greater than the thickness of said pastille, said third part further being in said vertical position of its orifice crossed by said first part.

BRIEF DESCRIPTION OF THE SEVERAL VIEWS OF THE DRAWING(S)

Other features and advantages of the present invention will become apparent in the light of the detailed description of an embodiment made with reference to the following FIGS. 1 to 11:

FIG. 1 illustrates a perspective view of an extraction device or group 11 according to the present invention comprising a chassis 8 supporting a said first part 1 able to be driven into longitudinal relative translation by displacement of a male guiding element 1g inside a first guiding groove 8a of both flanks 8-1 of the chassis 8, the second part 2 being fixedly mounted in said translation between both flanks 8-1 of the chassis 8 facing the first part 1, the third part with a pivoting cradle shape 3 being mounted and jointed in rotation by the first guiding and pivoting elements forming a rotary shaft 3-2 able to be displaced in translation in a second longitudinal groove 8b of both flanks 8-1 of the chassis 8.

Figure 1:
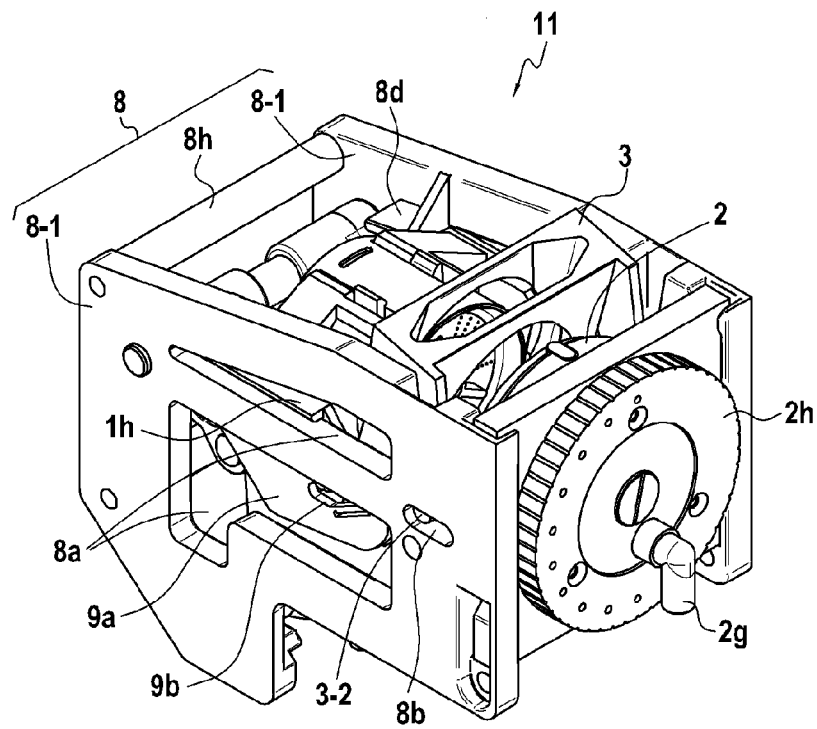
FIG. 1A is a perspective sectional view along a middle vertical longitudinal plane of the device 11 of FIG. 1.
FIG. 1B is a partial sectional view showing the front face 1-1 of the first part 1 as a perspective.
FIG. 1C is a sectional view showing the front face 2-1 of the second part 2 as a perspective.
Figure 1A:
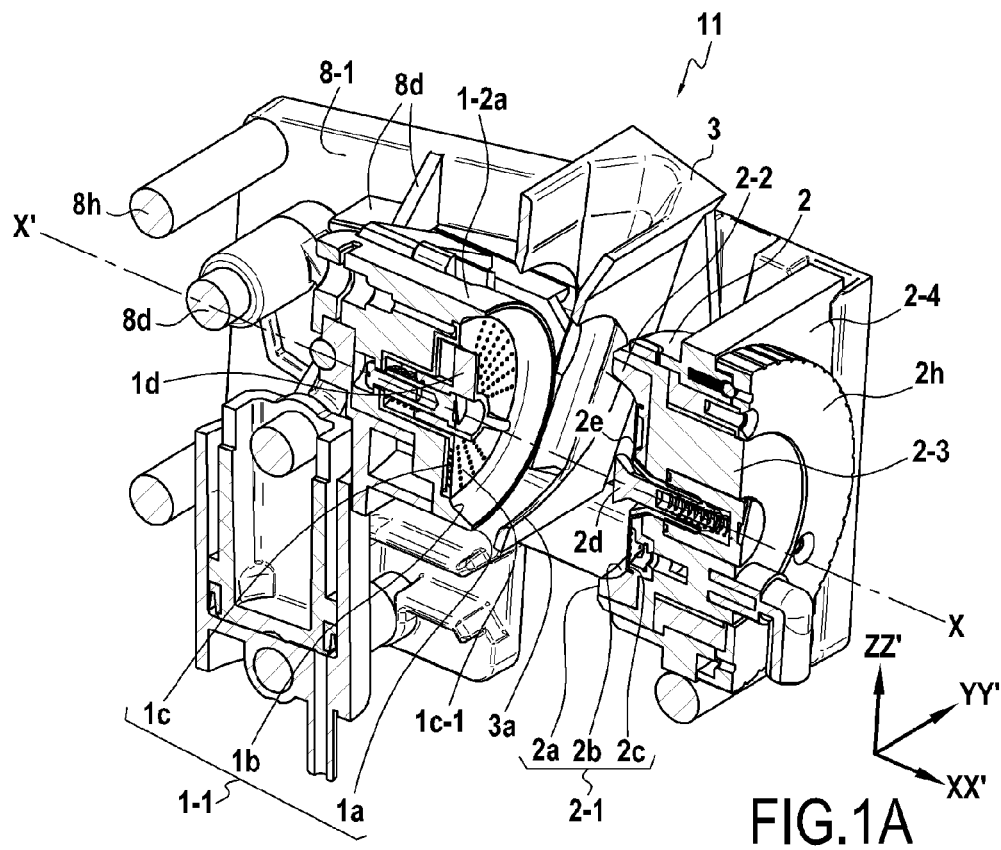
Figure 1B:
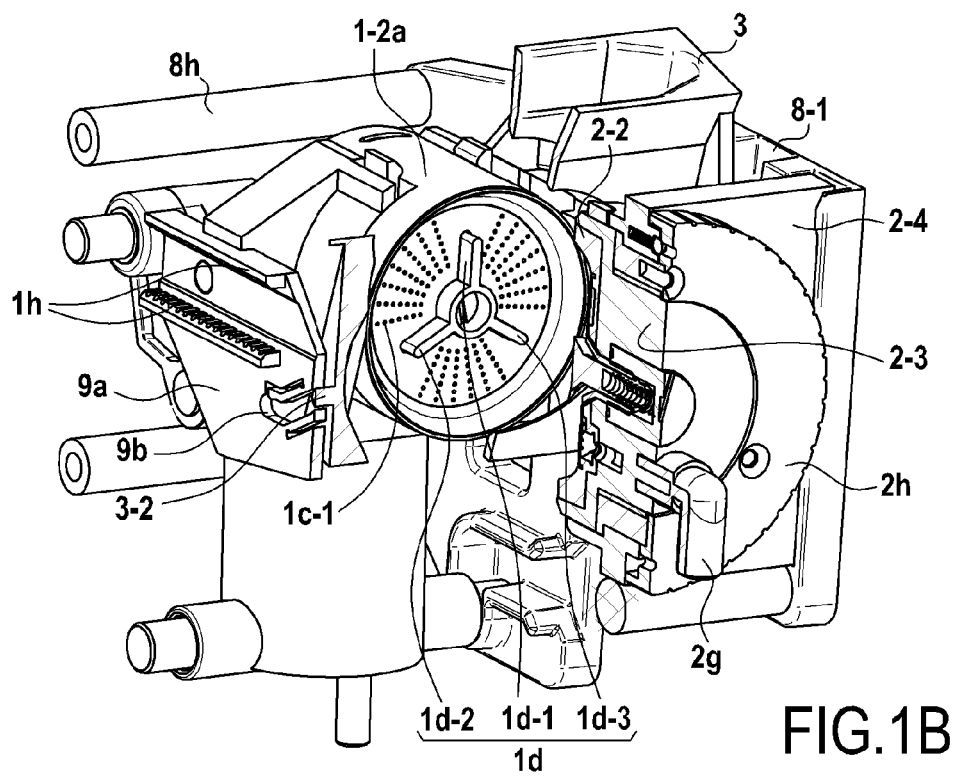
Figure 1C:
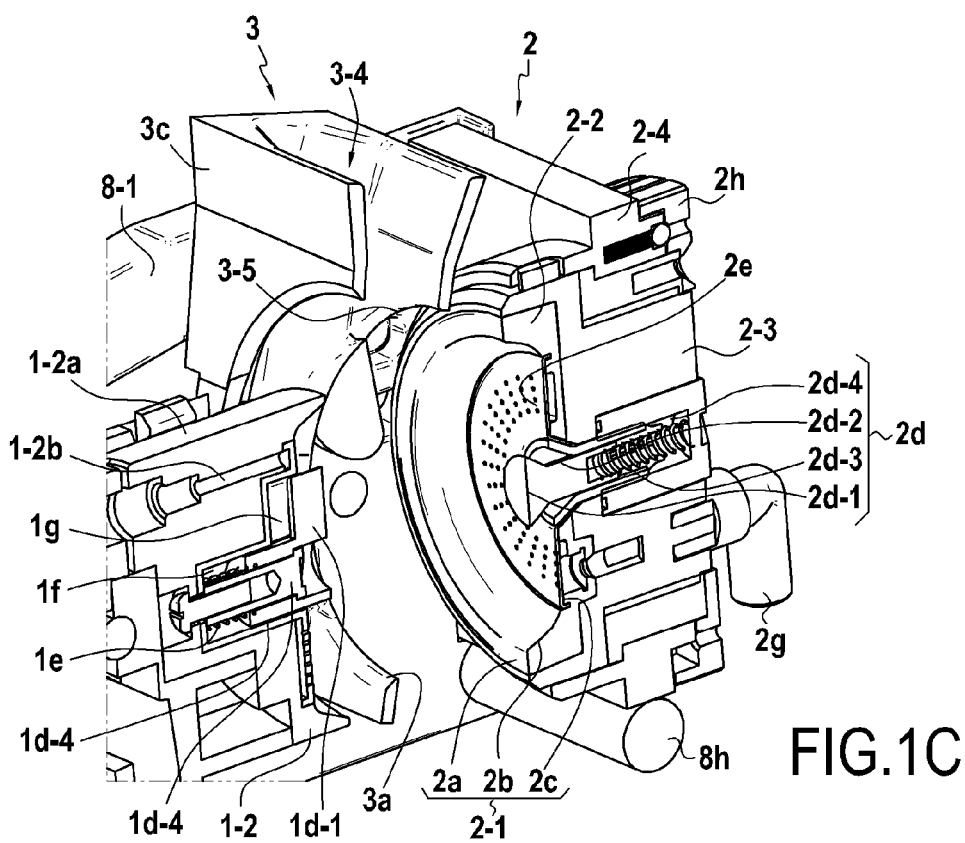
Figure 1D:
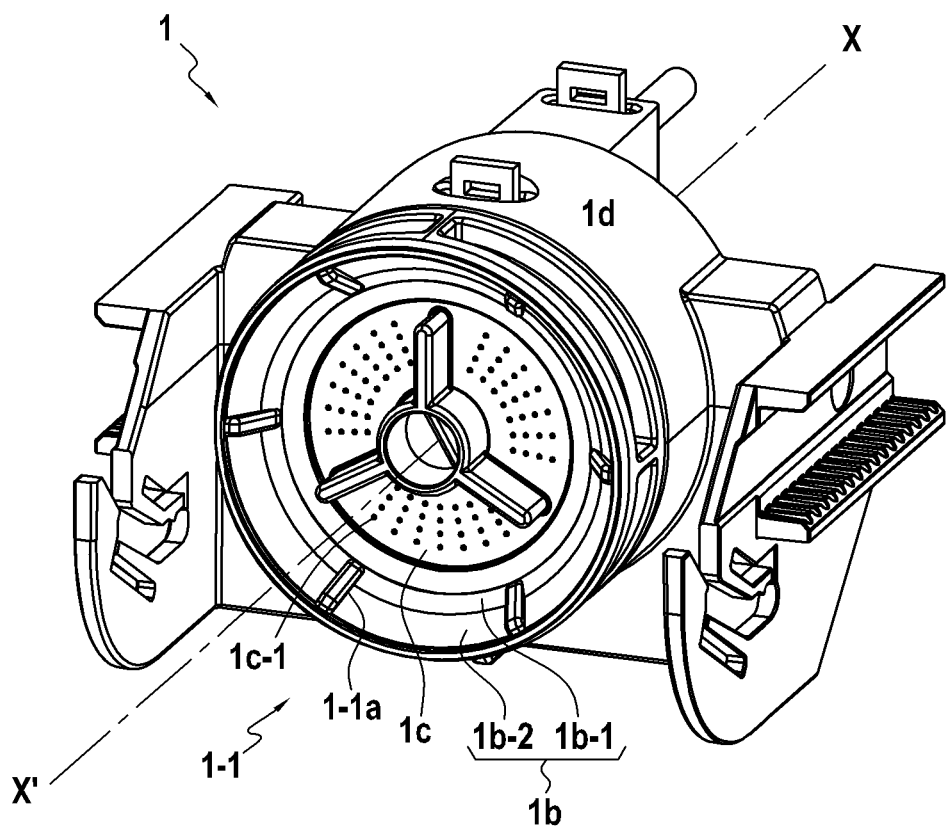
Figure 1E:
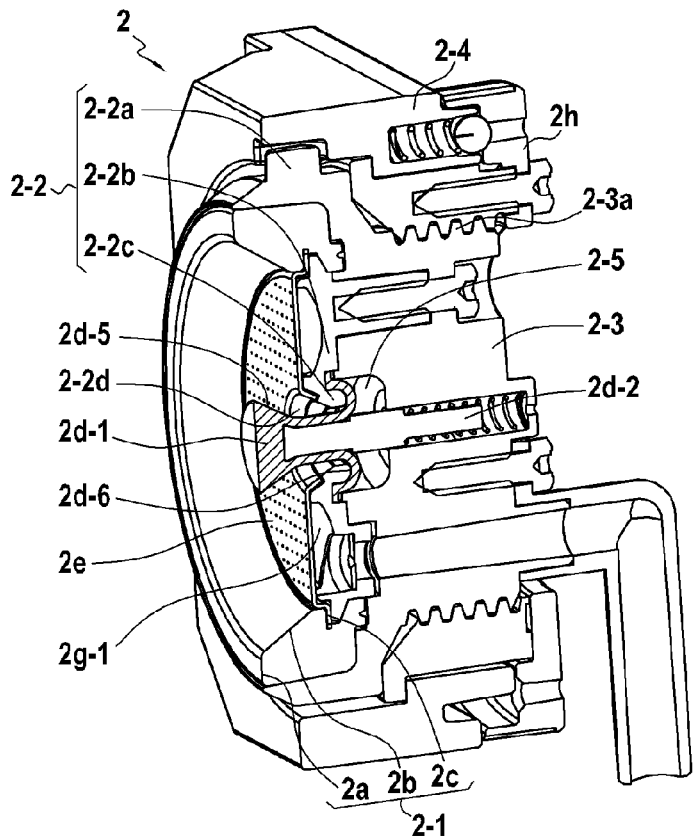
Figure 1F:
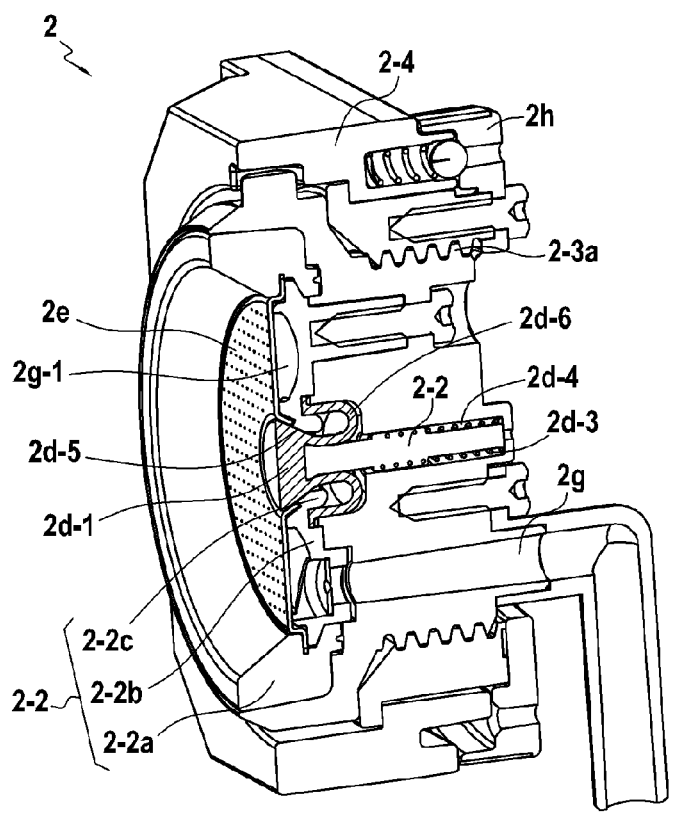

FIG. 1D is a perspective view showing the front face of said first part 1 with protrusions 1-1a and a first ejector 1d, and FIGS. 1E and 1F are axial sectional views of said second part 2 showing the junction and sealing means 2d-6 of the head 2d-1 of the second ejector 2d with respect to the front portion 2-2 of the second part 2.

Figure 2A:
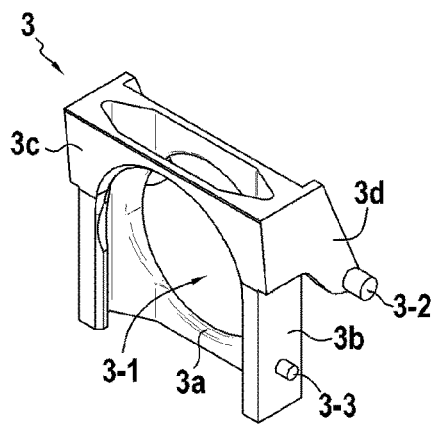
Figure 2B:
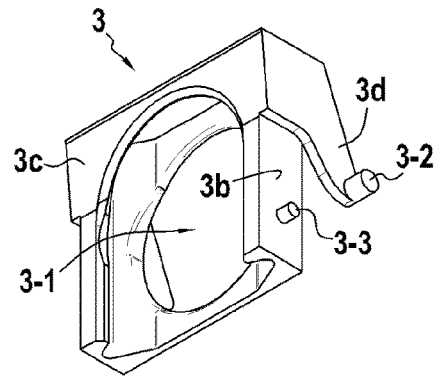
Figure 2C:
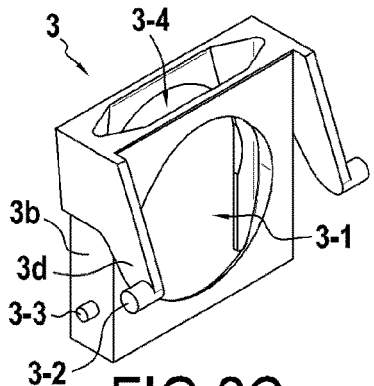
Figure 2D:
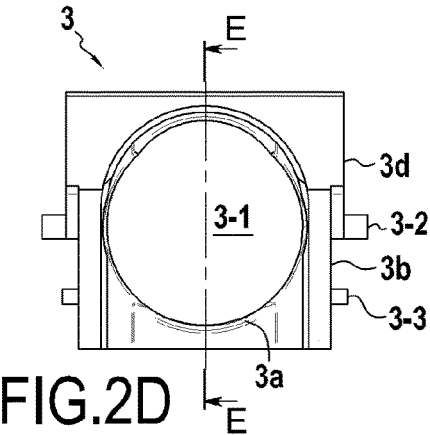
Figure 2E:
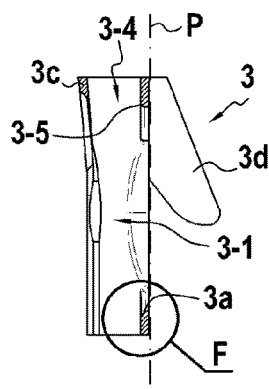
Figure 2F:
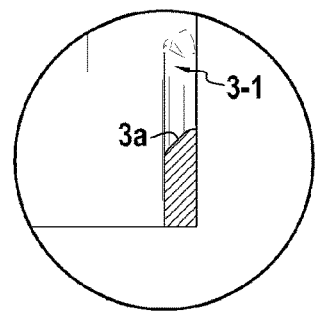
Figure 2G:
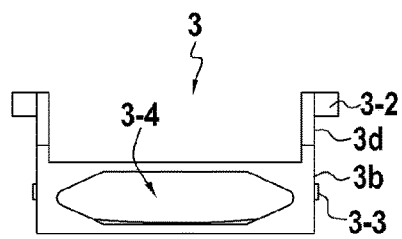

FIGS. 2A to 2G are views of the third part 3 as a perspective as a perspective top rear view (FIG. 2A), as a bottom rear perspective view (FIG. 2B), in a front perspective view (FIG. 2C), in a rear face view (FIG. 2D), in a side view (FIG. 2E), in detail of the lower portion of the frusto-conical supporting surface 3a (FIG. 2F) and in a top view of the pod guide (FIG. 2G).

Figure 3A:
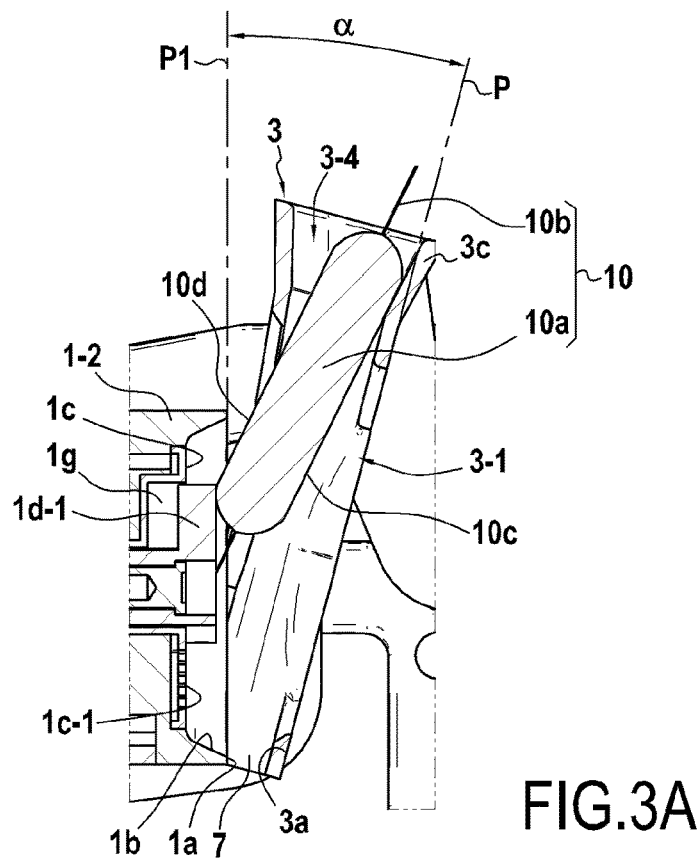
Figure 3B:
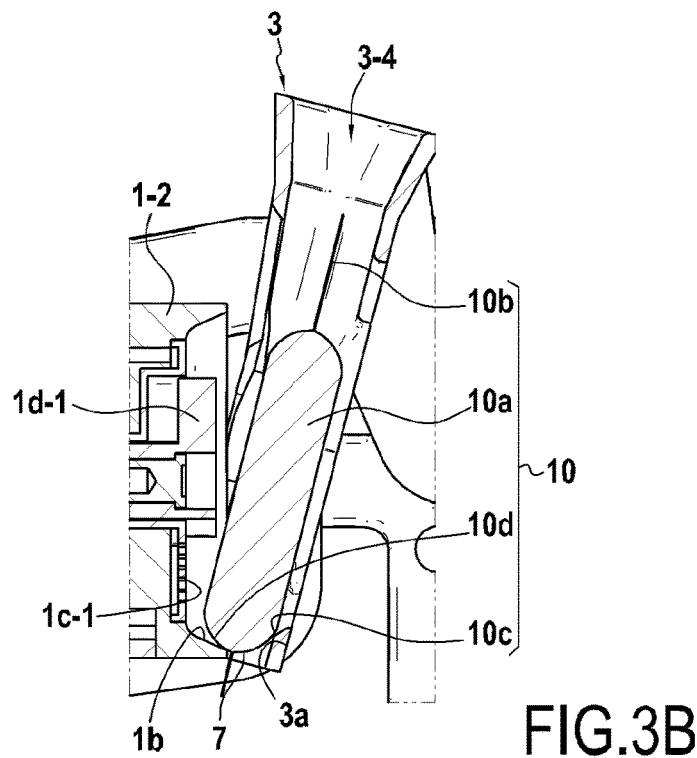

FIGS. 3A and 3B are sectional views of the insertion of the pod, in said insertion compartment during the fall of the pod (FIG. 3A) and once the pod is in place against the lower portion of the rear frusto-conical surface of the pivoting cradle (FIG. 3B).

Figure 4A:
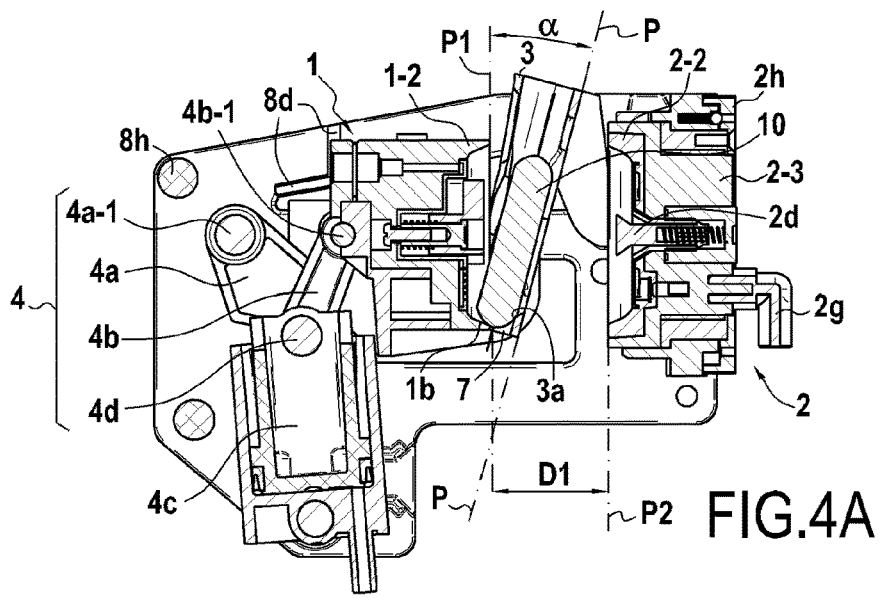
Figure 4B:
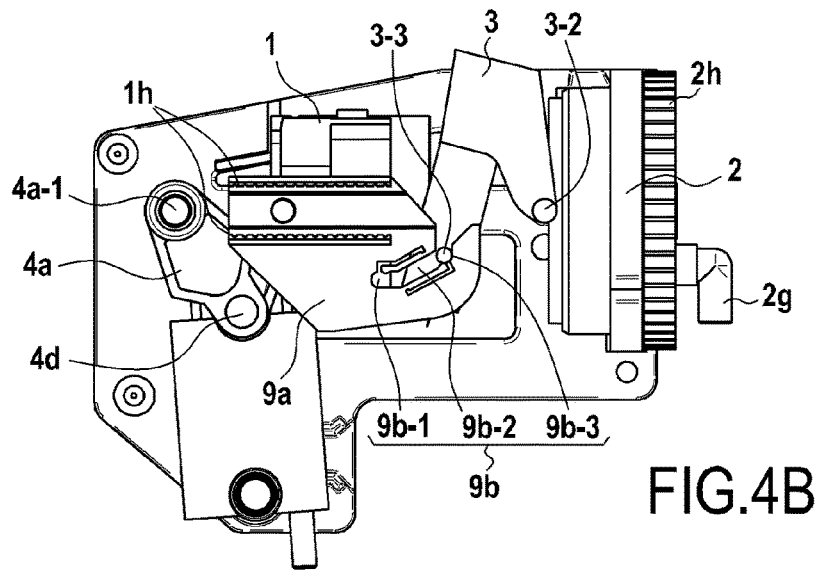
Figure 4C:
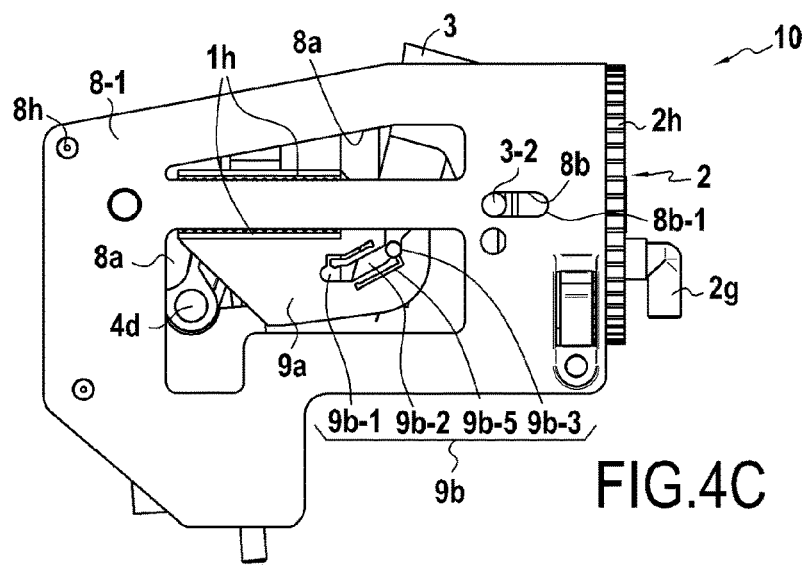

FIGS. 4A, 4B and 4C illustrate sectional and side views of the initial opening position with maximum tilt, a maximum rear translation position of the first part 1.

Figure 5A:
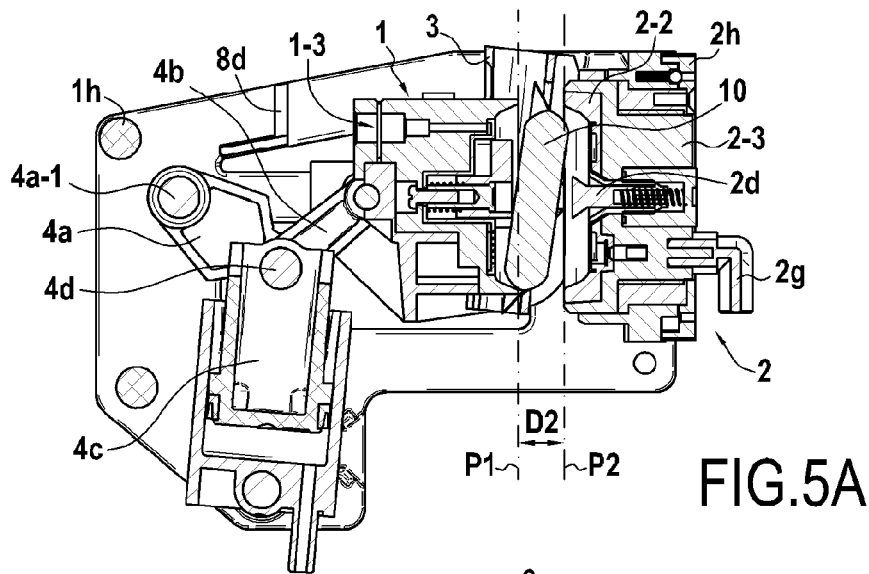
Figure 5B:
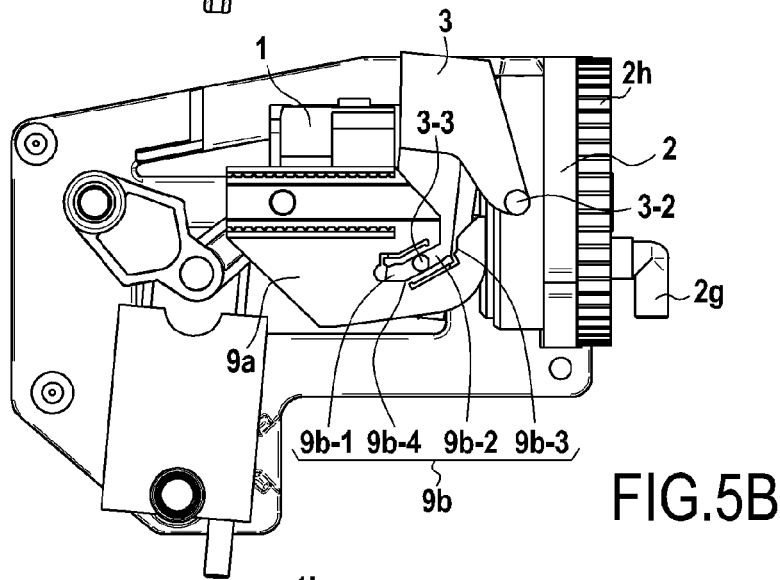
Figure 5C:
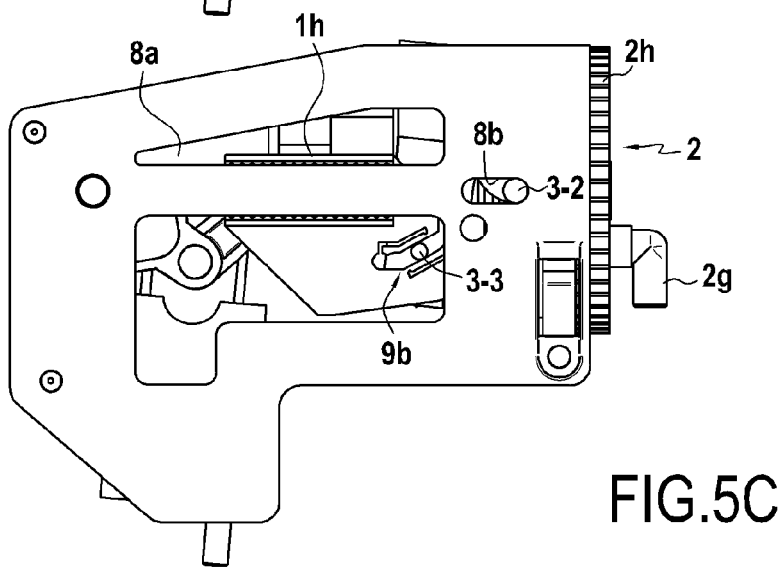

FIGS. 5A, 5B and 5C illustrate views of a front translational intermediate position of the first part 1 and of the third part 3 tilted according to a reduced tilt because of the synchronized translation and pivoting of the third part 3 when the abutment element forming the axis of rotation 3-2 of the third part 3 is in abutment at the front end of the second groove 8b of the chassis 8.

FIGS. 6A, 6B and 6C are views of intermediate position in which said third part is in a vertical position with the pod, maintained on each of its faces by the first and second ejectors of said first and second part during an intermediate phase with relative translation towards the front of the first part 1 towards the second part 2 during the closing of the extraction group.

FIGS. 7A, 7b and 7C are views of the extraction group in a said closing position, the pod being compressed in said extraction chamber.

Figure 8A:
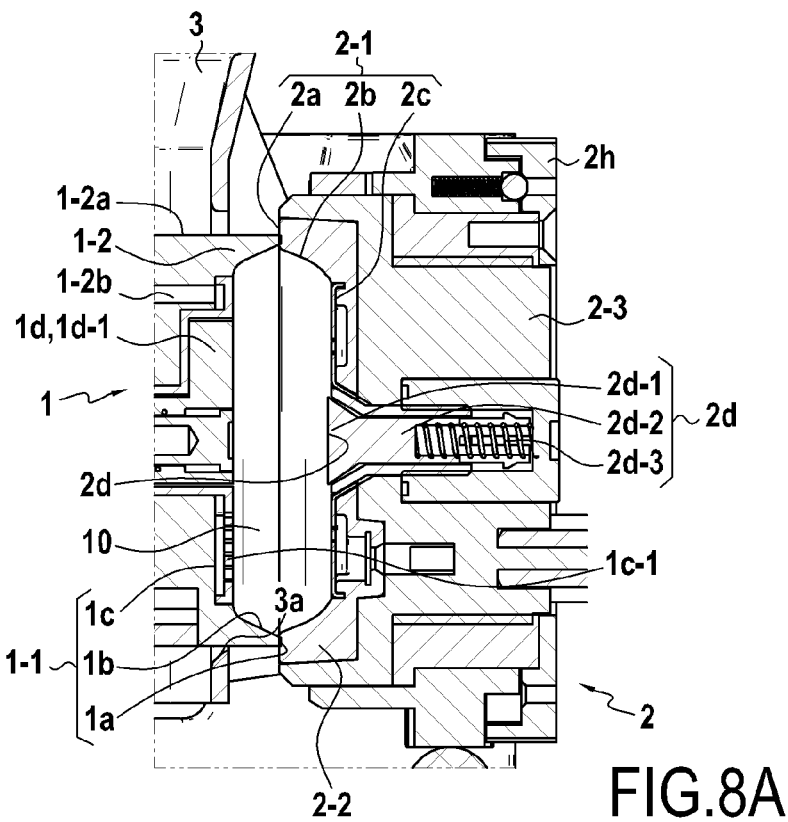
Figure 8B:
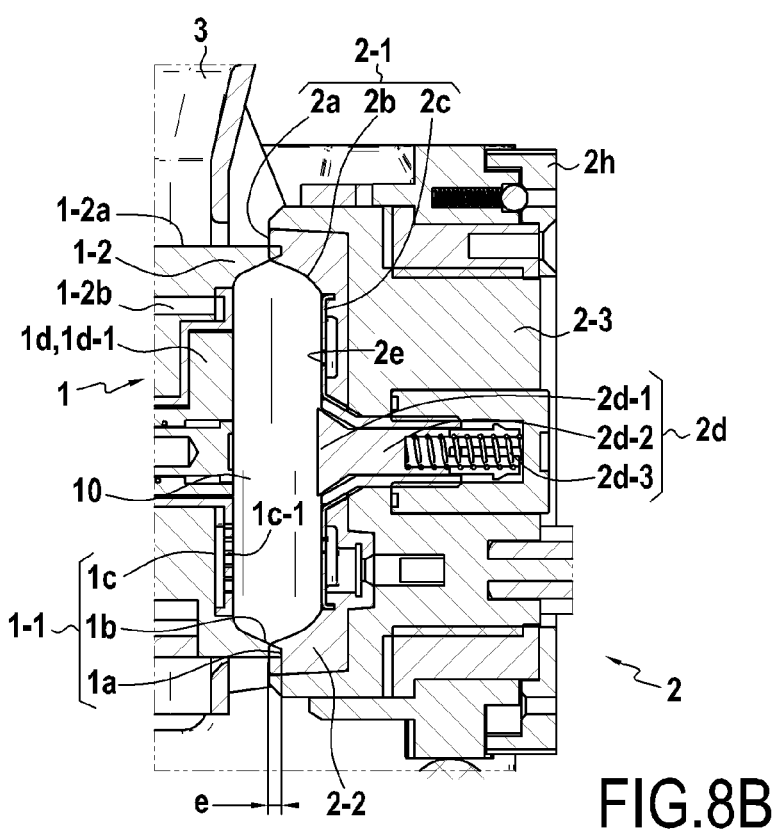

FIGS. 8A and 8B are views showing the extraction chamber adjusted according to a greater volume (FIG. 8A) and according to a smaller volume (FIG. 8B) by adjusting the thumb wheel 2h.

Figure 9A:
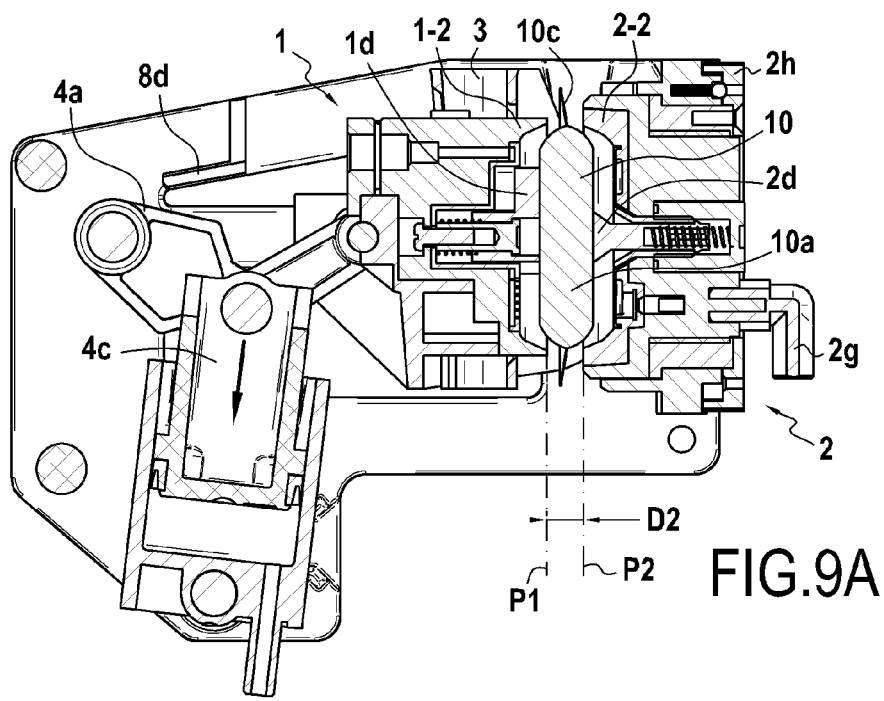
Figure 9B:
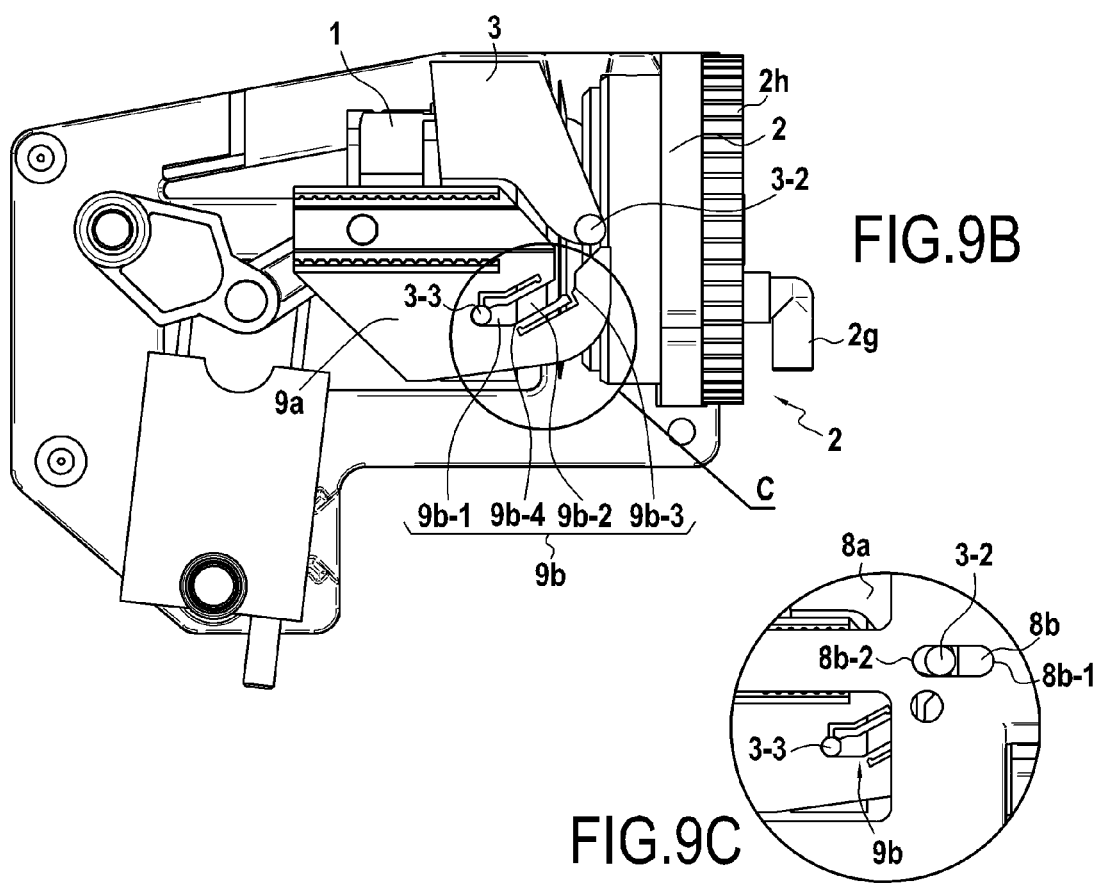
Figure 9C:
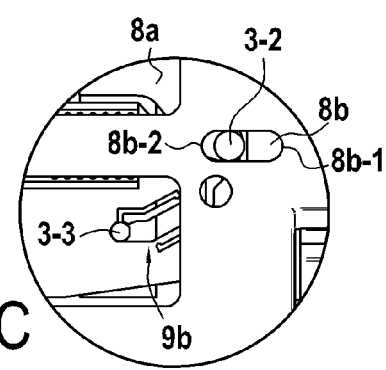

FIGS. 9A, 9B and 9C are views of the extraction group 11 upon reopening the extraction group in an initial discharge/evacuation phase for the pod, said pivoting cradle 3 being in a vertical position during the initial rear translation of the part 1, the pod being maintained vertical in a coaxial position by both ejectors 1d and 2d and the separation D2 between both parts 1 and 2 being insufficient for allowing discharge of the pod.

Figure 10A:
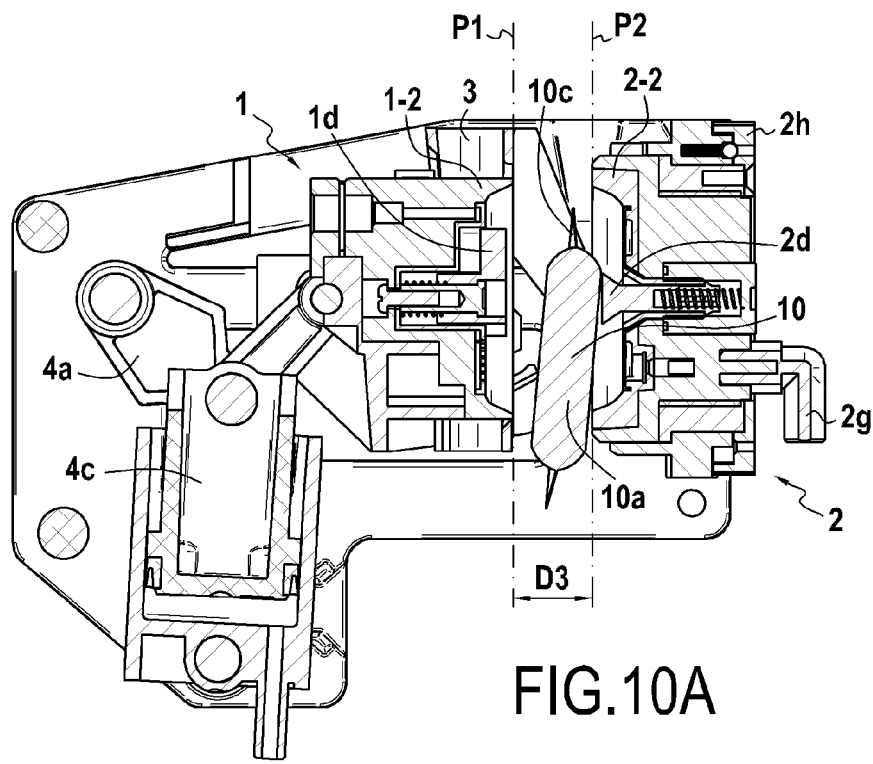
Figure 10B:
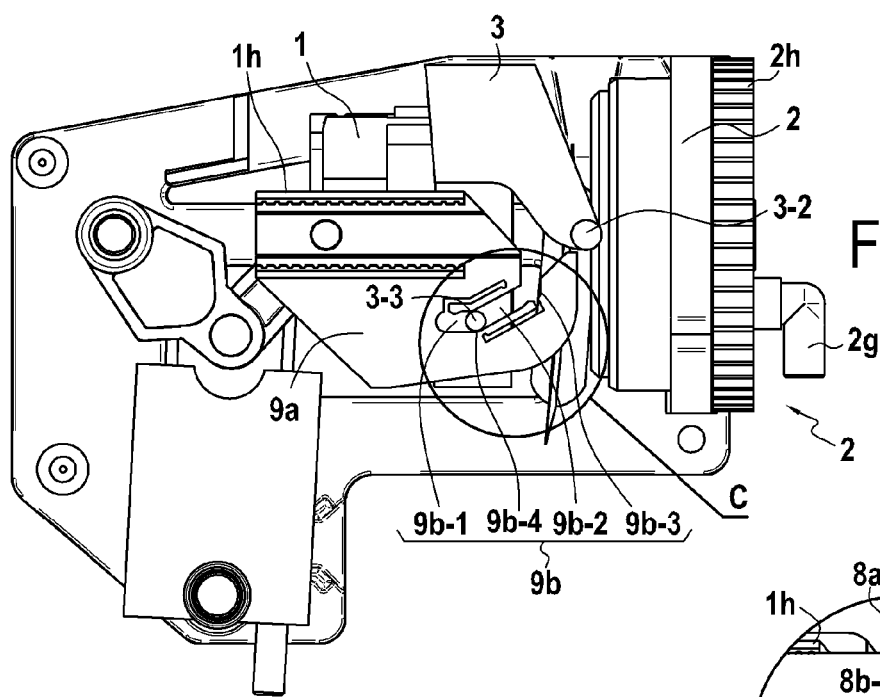
Figure 10C:
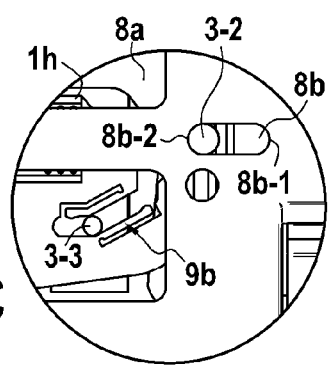

FIGS. 10A, 10B and 10C are following rear translational views showing the fall of the pod from its discharging compartment, the third part or pivoting cradle 3 being in a vertical position. The plane P of the orifice 3-1 of the cradle having joined up with the plane P1 limiting the front face of the first part, the separation D3 between the first parts 1 and 2 being greater than the thickness D of the pod, the pod, no longer being in contact with the ejector 1d allowing discharge of the pod from the discharging compartment 6.

FIGS. 11A, 11B and 11C are views illustrating the group 11 upon being reopened by maximum translation away by a distance D1 of both parts 1 and 2, the cradle 3 being in a position of maximum tilt.

DETAILED DESCRIPTION OF THE INVENTION

The term of "cradle" is used here for meaning that the relevant part is a supporting part with a curved shape.

The terms of "front" and "rear" in connection with the first and second parts have been defined earlier.

For the cradle 3, the front face is the face facing the second part while the rear face is the face facing the first part in said initial opening position.

The device according to the invention called an extraction group 11 comprise a chassis 8 consisting of 2 side flanks 8-1 extending in longitudinal planes in the XY directions parallel with each other, spaced apart and connected by transverse rods 8h extending in the transverse direction YY'. Between the flanks 8-1 are positioned a first head called an inlet head 1 and a second head called an outlet head 2. The first head 1 and second head 2 have cylindrical front portions 1-2 and 2-1 positioned coaxially facing each other, in the longitudinal direction XX'.

The first inlet part or head 1 has a front portion 1-2 with an external cylindrical surface, the front face 1-1 of which, facing the front face 2-1 of the second part 2 consists of:

A first flat ring-shaped front peripherally supporting surface 1a with a circular section extending in a transverse plane P1 perpendicular to the longitudinal axial direction XX', and A first internal central surface 1c with a circular section in a transverse plane XY, with a smaller diameter than said first front peripherally supporting surface 1a, and positioned set-back in the longitudinal direction XX' with respect to the latter and coaxially along the longitudinal axis XX', and A first front frusto-conical surface 1b ensuring the junction between the circular circumferences of said first internal central surface 1c and said first front peripherally supporting surface 1a.

The first front supporting surface 1a is therefore delimited by an external circular circumference formed by the front end of said external cylindrical surface 1-2a of the front portion 1-2 and delimited by the largest diameter of the front end of said first frusto-conical front surface 1b substantially arriving in a same transverse vertical plane P1 in a direction XY as said first front supporting surface 1a of said front face 1-1 of the first part 1.

In other words, said first front peripherally supporting surface 1a is formed by the pointed end of the junction of said first front frusto-conical surface 1b and of said external cylindrical surface 1-2a.

In FIG. 1D, 6 protrusions 1-1a generating raised ribs on the non-cylindrical axisymmetrical surface 1b comprising two adjacent frusto-conical portions 1b-1 and 1b-2 are illustrated. The protrusions 1-1a extend in the longitudinal axial direction XX' of the first part 1 and are regularly angularly spaced out over the whole of the circular perimeter of said non-cylindrical axisymmetrical surfaces 1b in section in a plane perpendicular to the axis XX'. These protrusions 1-1a prevent adherence by a suck-cup effect of the pod, in contact with the small supporting surface 1b because said pod is not entirely in contact with said surface 1b at immediately adjacent areas to the said protrusions 1-1a. These protrusions 1-1a therefore facilitate the discharge of the pod on the same lines as the first ejector 1d described hereafter by preventing the pod from adhering by a suck-cup effect on the surface 1b which would risk preventing the discharge of the pod by gravity in said final discharge position as described hereafter.

The second part 2 comprises a cylindrical front portion 2-2 consisting of a part in compressible silicone material and having a front face 2-1 having in section in a transverse plane XY a circumference. The front face 2-1 of said part in silicone material 2-2 forms:

A said second flat ring-shaped front peripherally supporting surface 2a, forming a supporting surface intended to bear against a first front peripherally supporting surface 1a of the first part 1 described hereafter facing which it is always located, and A second planar internal central surface 2c with a circular circumference in a cross-section in a plane XY, co-axially positioned along the longitudinal direction XX', set-back with respect to said second front peripherally supporting surface 2a, the diameter of the circumference of said second central surface 2c being smaller than the internal diameter of said second ring-shaped peripherally supporting front surface 2a, and A second front frusto-conical surface 2b ensuring the junction between the internal circumference of said second ring-shaped peripherally supporting front surface 2a and the external circumference of said second set-back internal central surface 2c.

Said second set-back internal central surface 2c supports a second perforated plate 2e with a circular circumference in a transverse plane XY co-axially positioned along the longitudinal axis XX' in front of said second central surface 2c.

The second part 2 comprises at least one external peripheral body 2-4 laterally attached on each of the 2 side walls 8-1 of the chassis. The external body 2-4 surrounds said central body 2-3 and cooperates with the latter by means of a rear thumb wheel 2h as described further on. The central body 2-3 of the second part 2 is crossed by a discharge conduit 2g from empty spaces 2g-1 behind the second perforated plate 2e and opening on the other side at the rear of the body 2-3. The perforated plate 2e acts as a filter so that the aroma-enriched liquid is discharged through the discharge conduit 2g behind said plate 2e.

The body 2-3 comprises a central cylindrical cavity 2d-4 co-axially positioned in the longitudinal direction XX' within which is attached an elastic return means 2d-3 cooperating with the rod 2d-2 of a said second ejector 2d having a head with a circular section 2d-1 in a transverse plane XY passing through a central perforation of said second perforated plate 2e and able to be actuated elastically in the longitudinal direction XX'. In the extension position of the spring 2d-3 as shown in FIGS. 1C and 1E, the head 2d-1 of the second ejector 2d is extracted in front of said second plate 2e while remaining set-back from the transverse plane P2 of said second front peripherally supporting surface 2a perpendicular to the longitudinal axial direction XX'.

By pressing in the longitudinal direction XX' on the head 2d-1 of the second ejector 2d, the spring 2d-3 is compressed and the ejector 2d enters the cylindrical cavity 2d-4 of the body 2-3 as shown in FIGS. 1F and 7A so that the front planar surface with a circular circumference of the head 2d-1 arrives in the same plane as said second plate 2e in front of the second internal central surface 2c.

In FIGS. 1E and 1F, an embodiment of the head forming second supporting elements 2d-1 of the second ejector 2d made in silicone which will cover the rigid rod 2d-2 and extending with a rear flange 2d-6 in silicone, the end of which is attached on the rear face of said front portion 2-2 of the second part 2 opening into a cavity 2-5 between the central body 2-3 and its front portion 2-2, will be shown. The cavity 2-5 opens onto a central orifice 2-2d of the front portion 2-2 of the second part 2 crossed by the rod 2d-2 covered with rear portion in silicone of the head 2d-1.

This embodiment is advantageous for preserving the seal of the cavity 2d-4 containing the spring 2d-3.

Indeed, in the extension position of the ejector 2d, the rear frusto-conical surface 2d-5 in silicone in the head 2d-1 forming the second supporting elements is spaced out towards the front with respect to the orifice 2-2d, but the seal of the cavity 2d-4 and of the spring 2d-3 is preserved since the junction flange in silicone 2d-6 is sealably clamped against a portion 2-2c of the rear face of the front portion 2-2 of the second part 2. And, when the second ejector 2d is in a set-back position with the compressed spring 2d-3, the rear frusto-conical portion 2d-5 of the head 2d-1 of the second ejector will abut against the peripheral surface delimiting the central aperture 2d-2d of said front portion 2-2 of the second part 2 and ensure the sealed closure of said orifice 2-2d. These sealed closures of the central orifice 2-2d in an extension position and in a set-back position of the second ejector 2d are advantageous since the coffee cannot thereby stagnate in the cavity 2d-4 and cohabit with the spring, which might in the long term generate development of bacteria and also block the second ejector by adhering to it.

Said first set-back internal central surface 1c is coaxially positioned facing said second set-back internal central surface 2c having both surfaces 1c and 2c substantially having the same diameter. Also, said first front frusto-conical surface 1b and said second front frusto-conical surface 2b substantially have the same diameters, and are positioned substantially symmetrically with respect to their transverse junction plane when the first front peripherally supporting surface 1a and the second front peripherally supporting surface 2a are in abutment and bearing against each other by relative translation for maximum approach of said first part 1 with respect to the second part 2.

The first part 1 cooperates with the chassis 8 via male guiding elements 1h on each side of the first part 1, guiding in translation in the longitudinal direction YY', the first part 1 because said male guiding elements 1h are inserted in longitudinal guiding grooves made by recesses 8a of each sidewall 8-1 of the chassis 8.

The front cylindrical portion 1-2 of the first part 1 comprises a central cylindrical cavity 1f coaxially positioned along the longitudinal axis XX'. Inside the cavity 1e is mounted an elastic return means cooperating with a rod 1d-4 of a first ejector 1d, said rod 1d-4 of which bears at its front end three branches 1d-1, 1d-2, 1d-3 radially positioned at 120°, an upper branch of which 1d-1 in a longitudinal axial plane XZ and two side lower branches 1d-2 and 1d-3 symmetrically positioned with respect to said longitudinal axial plane XZ.

The first set-back internal central surface 1c includes three cavities or housings 1g able to receive the three branches 1d-1, 1d-2, 1d-3 when a thrust is exerted on said three branches 1d-1, 1d-2, 1d-3 by compressing the spring 1e. In an extension position towards the front of the spring 1e, the three branches 1d-1, 1d-2, 1d-3 arrive in the longitudinal direction XX' in front of said first set-back surface 1c but always at the rear of the limiting plane P1 of the first peripherally supporting face 1a delimiting said front face 1-1 of the first part 1.

The first set-back internal surface 1c is advantageously covered with a first perforated plate comprising perforations 1c-1 between said three housings 1g positioned at 120°. The cylindrical body 1-2 of the first part 1 is crossed by a supply conduit 1-2b, the different perforations 1c-1 of the plate covering the first set-back central surface 1c allowing uniform distribution of the liquid injected through said first front face 1-1 of the first part 1.

The second part 2 includes a peripheral rear thumb wheel 2h at the rear of the external body 2-4 and of the central body 2-3 and around the central body 2-3. Said thumb wheel 2h is screwed onto a threading 2-3a of the cylindrical external surface of the body 2-3 so that by screwing the thumb wheel 2h, it is possible to displace forwards the body 2-3 carrying away the front portion 2-2 in silicone material of the second part 2. The front part 2-2 in silicone will be crushed against the first front supporting surface 1a of the first part 1 when the latter bears against the second front peripherally supporting surface 2a in silicone as shown in FIG. 8A. The thumb wheel 2h gives the possibility of advancing or moving back the exit head 2 by a few millimeters which is made possible by the compressibility of its second front peripherally supporting surface 2a in silicone. By adjusting the thumb wheel 2h, the reduced surface by its pointed shape of said first peripheral front surface 1a sinks into the silicone surface of said second front peripherally supporting surface 2a as shown in FIG. 8B. The adjustment of the thumb wheel 2h thus gives the possibility of adjusting the distance between the first set-back central surface 1c and the second set-back central surface 2c and therefore gives the possibility of adjusting the volume of the extraction chamber described hereafter. This gives the possibility of adjusting the amount of extracted flavor from the coffee contained in the pod by modifying the compression of the pod 10 in the extraction chamber and therefore by modifying the time of flow of the liquid through said pod during the extraction step described hereafter. This also allows adaptation of the extraction chamber to different types of pods with variable thickness and/or diameter and/or containing more or less finely ground coffee and/or more or less compacted.

Being able to adjust the compression of the pod by modifying the volume of the extraction chamber and therefore the time of flow of the coffee through the pod, is a major and original advantage of the present invention.

The first part 1 includes on each side and facing each internal face of the side walls 8-1 of the chassis 8, plates 9a. These plates 9a comprise grooves 9b which ensure the guiding of the second male guiding elements 3-3 of the third part 3 giving the possibility of forcing pivoting of the cradle 3 around the first male guiding and pivoting elements 3-2 forming an axis of rotation engaged into grooves made by recesses 8b of the side walls 8-1 of the chassis 8 on each side of the latter as described hereafter.

The pivoting cradle 3 forms a ring delimiting a partly circular or oval aperture 3-1 with at least one semi-circular lower portion, the plane P of said aperture extending at least in a transverse direction YY'.

The pivoting cradle 3 is mounted with a cinematic link with the first part 1, synchronized translation and pivoting as described hereafter.

The orifice 3-1 is delimited in a lower portion by a frusto-conical surface on the rear face of said ring with a diameter such that the lower portion of said frusto-conical rear surface is able to continuously support the peripheral convex lower portion of the solid pastille 10c of a pod 10 on its front face 10c and the upper portion 3-5 is able to support the upper portion of the flange 10b.

Said frusto-conical surface 3a is laterally bordered by side edges 3b able to laterally maintain the flange 10b surrounding the solid pastille 10a of the pod 10 for maintaining it in the axis XX' of said orifice corresponding to the axis XX' of said first and second parts when said pivoting cradle is in a pivoting position with the plane P of said orifice positioned vertically in a direction XY.

The pivoting cradle 3 comprises two first pivoting elements 3-2 forming an axis of rotation extending in the transverse direction YY' positioned on each side of said pivoting cradle and cooperating with second guiding grooves made by recesses 8b extending rectilinearly and longitudinally in the direction XX' in both side walls 8-1 of the chassis 8.

More specifically, the first pivoting elements 3-2 forming an axis of rotation are supported by side skirts 3d of a guide forming an insertion hopper 3c delimiting an aperture 3-4 in the upper portion of the cradle above said orifice 3-1 and at the rear of the latter. The first pivoting elements 3-2 forming an axis of rotation are positioned in front of the second male guiding and pivoting elements 3-3 guided in the guiding grooves made by recesses 9b.

The guiding grooves 9b comprise a rectilinear portion 9b-1 extending in the longitudinal direction XX' and which extends towards the front of the first part with an ascending tilted groove portion 9b-2, ending with its upper end with an abutment 9b-3 preventing forward translation of the second male guiding and pivoting elements 3-3.

The relative positions of the guiding grooves 8b secured to the chassis 8 in front and above the guiding grooves 9b, 9b-1, 9b2 of the plates 9a secured to the first part 1, allow synchronized translation and pivoting of the pivoting cradle 3 as described hereafter.

The longitudinal translation of the first part 1 is obtained by translation means 4 comprising systems of connecting rods 4a, 4b, one connecting rod 4a of which has an end 4a-1 secured to the chassis 8, the other connecting rod 4b has an end 4b-1 secured to the first part 1. Both connecting rods are connected together and jointed in rotation at their other end by a rotatably jointed connecting element 4d. A hydraulic actuator 4c allows actuation in rotation of said connecting rods. Because the first part 1 is guided in longitudinal translation in the longitudinal grooves 8a of the chassis 8, actuation in rotation of the system of connecting rods causes said longitudinal translation of the first part 1.

The relative translation means 4 of the first part 1 with respect to the second part 2 may be made with any other screw- or cam-driven system or other system instead of the connecting rod system described above. The actuator 4c may be replaced or completed with a manually actuatable lever not shown.

Because the pivoting cradle 3 is made secured to the chassis 8 by its first pivoting elements 3-2 forming a rotation shaft and its second guiding elements 3-3 forming an abutment in guiding grooves 9b secured to the first part 1, the relative translation of the first part 1 with respect to the second part 2 causes rotation and and/or pivoting of the pivoting cradle 3 as described hereafter.

In an initial position with maximum relative translation D1 separation of the first part 1 with respect to the second part 2, the first pivoting elements 3-2 forming a rotation shaft are in abutment with the rear end of the guiding groove 8b of the chassis 8 while the second male guiding elements 3-3 are positioned at the upper end of the ascending tilted portion 9b-2 of the groove 9b secured to the first part 1. In this position, said small guiding elements 3-3 may cooperate with retaining clips.

In this initial position of maximum translation separation D1 of the first part with respect to the second part 2, the pivoting cradle 3 is found in a maximum tilt position with the plane P of the rear planar face of the aperture 3-1 of the pivoting cradle 3 tilted by an angle α of about 15° with respect to the vertical plane P1 of the front face 1-1 of the first part 1 forming a V-shaped insertion compartment.

In this initial maximum separation position, the first ejector 2d is in a forward-extended position with respect to the first set-back central surface 1c substantially at the front face 1-1 of the first part 1.

The shape of the first ejector 1d gives the possibility, when the pod 10 is inserted through the upper aperture 3-4 of the insertion guide 3c with a hopper shape, of having the lower portion of the convex peripheral portion of the pastille 10a on its rear face 10d of the pod 10 abut upon the vertical front supporting surface of the first upper branch 1d-1 in an extension position and the positioning of the pastille 10a is guided so that the front face 10c of its convex peripheral portion 10a will be positioned bearing against the lower portion of the rear frusto-conical surface 3a delimiting the orifice 3-1 of the pivoting cradle. If the upper branch 1d-1 of the first ejector 1d did not radially extend over a significant portion of the radius of the first internal central surface 1c of the front face 1-1 of the first part, the lower portion of the peripheral convex portion of the pastille 10a may be retained in its fore and/or blocked in its insertion by abutting against said first ejector 1d in an extended position. The pod would be laid resting above said first ejector and would not move down to the bottom of the insertion compartment 5 of the V-shaped pod.

Both lower branches 1d-2 and 1d-3 positioned laterally and symmetrically at 60° with respect to the median longitudinal vertical plane XZ of the first branch 1d-1, give the possibility of having the rear face 10d of the lower convex portion of the pastille 10a abut against said first front frusto-conical surface 1b of the front face 1-1 of the first part 1 when the rear face 10c of the same peripheral convex portion of the pastille 10a will abut against the rear frusto-conical surface 3a of the pivoting cradle 3. The angle of 120° between both side lower branches 1d-2 and 1d-3 is sufficient for leaving clear the lower portion of said first front frusto-conical surface 1b and so that the pod is not in contact with said branches in said opening position without hampering the insertion of said pod into the bottom of the insertion compartment.

In this maximum tilt position of the pivoting cradle 3, an open space 7 forming a slot is made between the lower portion of said first front supporting surface 1a and the lower portion of the frusto-conical supporting surface 3a of the cradle so as to be able to accommodate therein the lower portion of the flange 10b surrounding the pastille 10a of the pod 10.

Once the pod 10 is accommodated in the insertion compartment 5 delimited by the front face 1-1 of the first part 1 and the rear face of the frusto-conical surface 3a delimiting the orifice 3-1, it is possible to actuate relative translation of the part 1 so as to bring it closer to the part 2 as follows.

As shown in FIGS. 4A to 4C, because the second male pivoting elements 3-3 are blocked in translation by the portion 9b-3 forming an abutment and/or by a retaining clip 9b-5 on the one hand and the first guiding and pivoting elements forming a rotation shaft 3-2 may freely slide in the longitudinal direction XX' of the guiding groove 8b of a rectilinear shape, on the other hand, the pivoting cradle 3 remains in a said maximum tilt position during said translation until the first elements forming a rotation shaft 3-2 will abut at the front end 8b-1 of said grooves 8b secured to the chassis 8.

At this stage, as shown in FIGS. 5A to 5C, continuation of the relative longitudinal translation of the first part 1 with respect to the second part 2 by displacement of the guiding elements 1h in the groove 8a of the chassis 8, necessarily causes pivoting in translation of the cradle around its first guiding and pivoting elements forming a rotation shaft 3-2 because the second male guiding elements 3-3 slide in the tilted groove portion 9b-2.

As shown in FIGS. 6A to 6C, the length of the tilted groove 9b-2 is such that, when the second guiding elements 3-3 reach the lower end 9b-4 of said tilted portion 9b-2, the pivoting cradle 3 is found with the plane P of the orifice 3-1 in a vertical position between the 2 vertical planes P1 and P2 of the first front supporting surface 1a and second front supporting surface 2a of the first and respectively second parts still spaced apart by a distance D2 of less than the thickness D of the pod. In this intermediate relative translation position of the first part 1 with respect to the second part 2, the front cylindrical portion 1-2 of the first part 1 is partly passed through the coaxial orifice 3-1 of the pivoting cradle 3 in a vertical position, carrying away with it the pod 10 thus driven out of the pivoting cradle and itself passing through the orifice 3-1. The pod 10 is, however, maintained in a vertical position and maintained in height with its centre which remains coaxially aligned with the longitudinal axis XX' of both first part 1 and second part 2 by the two ejectors 1d and 2d bearing against the opposite faces 10c and 10d of the pod.

The contact surfaces of both ejectors 1d and 2d with both faces 10c, 10d of the pastille are sufficient so that with regard to the extension force of the return means of both ejectors, the pod remains positioned coaxially.

As shown in FIGS. 7A to 7C, when the relative translation is continued for bringing the first part 1 closer to the second part 2, the blocking of the first elements forming a rotation shaft 3-2 at the front end of the guiding grooves 8b of the chassis 8 on the one hand and the rectilinear shape of the lower portion 9b-1 of the guiding groove 9b secured to the first part 1, guides in longitudinal direction the pivoting cradle 3 along the same tilt with the plane P of the orifice 3-1 in a vertical position, so that the pivoting cradle remains in a vertical position until the flange 10b of the pod 10 is clamped between the first front supporting surface 1a of the first part 1 and the second front supporting surface 2a of the second part 2 and said closing position.

Once the pastille of the pod is compressed inside said extraction chamber in a said closing position of the extraction group 1, hot pressurized water is injected through the orifice 1-3 of the supply conduit 1-2b through the body of the first part arriving at the first perforated plate 1c-1. The liquid crosses the thickness of the pod while extracting the flavors of the compacted coffee powder inside the pod and then is discharged through the discharge conduit 2g passing through the body 2-3 of the second part 2 after having been filtered through the second perforated plate 2e applied in front of the second set-back central surface 2c of the front face 2-1 of the second part 2.

Once the extraction is completed, it is proceeded with the reopening of the extraction group by a relative translation away from the first part 1 with respect to the second part 2.

As shown in FIGS. 9A-9C, as long as the first guiding elements 3-2 forming an axis of rotation slide from the front end 8b-1 of the groove 8b of the chassis as far as the rear end 8b-2 of the groove 8b of the chassis, the pivoting cradle 3 is driven into rear translation with said first part without any pivoting since the second male pivoting elements 3-3 at the groove 9b secured to said first part also move in the rectilinear longitudinal translation from the rear end of the rectilinear portion 9b-1 of said groove 9b as far as its front portion 9b-4 which is attained when the first elements forming an axis of rotation 3-2 arrive at the rear end of the groove 8b of the chassis. Previously, the separation distance D2 between both front faces of both first parts is less than the thickness D of the pod, and the pod is maintained vertical and coaxial by both ejectors 1d and 2d bearing against its opposite faces 10c and 10d.

As illustrated in FIGS. 10A to 10C, said relative translation continues, the pivoting cradle 3 is still in a vertical position and the distance D3 between the first ejector 1d and the second ejector 2d is greater than the thickness of the pastille in the longitudinal direction XX'. Thus said this may be discharged by a falling by gravity into the open lower portion of the thereby formed discharging compartment 6, because the contact surface areas of said first ejector and second ejector with the pod are insufficient for having the latter remain adhered against one of said ejectors.

When the rear translation of the first part is continued for returning to the initial opening position with a maximum separation distance D1 between said first and second parts, as shown in FIGS. 11A-11C, the pivoting cradle pivots to find its said maximum tilt position again. To do this, the second male guiding elements 3-3 of the cradle 3 are guided in the ascending tilted portion 9b-2 of the groove 9b secured to the first part 1, while the first guiding and pivoting elements forming an axis of rotation 3-2 can no longer be displaced in a relative rear translation insofar that they are in abutment against the rear end 8b-2 of the longitudinal groove 8b of the chassis 8. This blocking of the elements 3-2 necessarily implies pivoting of the pivoting cradle 3 when a rear translation of the first part 1 is performed until the second male elements 3-2 of the guiding cradle in the tilted portion 9b-2 of the groove 9b arrive in abutment against the retaining portion 9b-3 at the top of the tilted portion 9b-2 of the groove 9b in front of said groove 9b. Thus the configuration of said initial opening position is again found with a maximum tilt of the pivoting cradle.

The maximum rear translation of the first part 1 with respect to the second part 2 is controlled by a transverse abutment 8d secured to said chassis against which to a rear portion of the first part 1 will abut. This rear transverse abutment 8d also allows control of the maximum front translation of the first part 1 by abutment of an abutment element secured to one of the connecting rods 4a, 4b when said connecting rods are actuated in rotation so as to perform a said forward translation.

The invention claimed is:

1. A device for preparing a flavored beverage, notably based on coffee flavors, able to extract flavors by infusion of a powder pod containing some of them, said pod having the shape of a flat or ovoidal pastille, filled with said powder, the device being able to extract the flavors contained in said powder when said pod is crossed by a liquid in an extraction chamber, said device comprising:
   a first part comprising a cylindrical front portion comprising a front face comprising a first front peripherally supporting surface, surrounding a first front non-cylindrical axisymmetrical surface, and
   a second part comprising a front cylindrical portion of a same axial longitudinal axis (XX') as the front cylindrical portion of said first part, comprising a front face positioned facing the front face of the first part, comprising a second front peripherally supporting surface surrounding a second front non-cylindrical axisymmetrical surface, and
   a third part pivotally mounted able to pivot with respect to an axis extending in a transverse direction (YY') perpendicular to said longitudinal axis (XX'), said third part being able to synchronously pivot with relative translation of both first and second parts, said third part comprising an orifice, in a plane P extending in said transverse direction (YY'), able to be crossed by said front cylindrical portion of said first part when said plane P of said orifice of said third part is in a vertical position, and
   means for displacement in a coaxial horizontal (XX') relative translation of said first part and second part and for synchronized pivoting of said third part, between:
   an initial opening and an insertion position in which said first and second parts are at a maximum distance from each other in translation, said third part being located in a tilted position between said first and second parts, the plane (P) of said orifice being in a position of maximum tilt with respect to a transverse vertical plane (YZ) perpendicular to said longitudinal axis (XX'), said third part in a maximum tilt position, delimiting with the front face of said first part and an insertion compartment able to receive and support said pod, said pod being able to be inserted by gravity into said insertion compartment open in an upper portion, and
   a closing position or for maximum approach in relative translation of both first and second parts in which said first and second peripherally supporting surfaces of said front faces of said first and second parts bear against each other, said front faces of said first part and front face of said second part delimiting a sealed compartment, called an extraction chamber, inside which said pastille is able to be compressed for producing an extraction, the plane P of said orifice being in a vertical position and crossed by at least said front cylindrical portion of said first part in said closing position, and
   a position for reopening and discharging by translationally moving away both said first and second parts delimiting a discharging compartment, said discharging compartment being able to receive said pod, said pod being able to be discharged by gravity after said extraction, out of said discharging compartment open in the lower portion.

2. The device according to claim 1, wherein it includes:
   a—said first part able to be moved in translation by said relative translation displacement means, and
   b—said second part which is not able to be displaced in translation by said relative translation displacement means, and
   c—said third part pivotally mounted on a common chassis supporting the three parts; said first part being guided in relative translation by first guiding elements secured to said chassis, said third part comprising guiding and pivoting elements, co-operating with additional guiding elements secured to said first part and to said chassis, so that said relative translation of the first part on a portion of its travel causes said pivoting of said third part.

3. The device according to claim 2, wherein a number of male pivoting and guiding elements of said third part cooperate with a number of groove-shaped mating female guiding elements secured to said first part and to said chassis so that said relative translation of the first part on a portion of its travel causes translation of said third part simultaneously with the translation of said first part but without any pivoting of said third part so that upon reopening of said device, said third part is driven into translation with said first part, said third part remaining with the plane P of its said orifice in a vertical position until the space between said first part and said second part is greater than the thickness of said pastille.

4. The device according to claim 1, wherein said orifice of said third part is at least partly circular and delimited by a rear peripheral surface of said third part facing said first part in said initial opening position, said rear peripheral surface being at least partly frusto-conical, able to at least support in its frusto-conical lower portion, a convex peripheral portion of the pastille filled with powder from said pod on a front face of the pod, an upper portion of said rear peripheral surface delimiting said orifice supporting an upper portion of the flange, the rear face of the same convex peripheral portion of the solid pastille-shaped portion of said pod in a tilted position in said insertion compartment bearing against a lower portion of said first front non-cylindrical axisymmetrical surface, of said first part, said first non-cylindrical axisymmetrical surface being frusto-conical.

5. The device according to claim 1, wherein:
said first part comprises a front portion with an external cylindrical surface with an axial longitudinal axis (XX'), the front face of which forms a first front peripherally supporting vertical surface, surrounding said first front non-cylindrical axisymmetrical surface, said first front non-cylindrical axisymmetrical surface being frusto-conical and surrounding a first set-back internal central surface, said first central surface being further perforated or covered with a first perforated plate for distributing the pressurized water supply injected through said first central surface towards said extraction chamber, and
said second part comprises a front portion with an external cylindrical surface with the same axial longitudinal axis (XX'), the front face of which forms a second front peripherally supporting surface surrounding said second front non-cylindrical axisymmetrical surface, said second front non-cylindrical axisymmetrical surface being frusto-conical and surrounding a second set-back internal central surface, said second central surface being perforated or covered with a second perforated plate able to filter the liquid after said extraction and before its discharge through said second part.

6. The device according to claim 1, wherein a volume of the extraction chamber in said closing position is adjustable by adjusting an advance of said front portion of the second part in said longitudinal direction (XX') with a thumbwheel, independently of said relative translation of said first part by said translational displacement means.

7. The device according to claim 1, wherein said front portion of said second part comprises at least in one portion a compressible material, at least in said front portion defining said second front peripherally supporting surface, second front non-cylindrical axisymmetrical surface, and at least one peripheral portion of said set-back central surface.

8. The device according claim 6, wherein the adjustment of said thumbwheel displaces in longitudinal translation said front portion in a compressible material of the second part and the compressibility of said compressible material is such that, when said first part is in translation for maximum approach of said second part, in said closing position, the compression of said compressible material allows advance of said second part by adjustment of said thumbwheel.

9. The device according to claim 5, wherein said first front non-cylindrical axisymmetrical surface of the front face of said first part, has protrusions angularly spaced apart along said front non-cylindrical axisymmetrical surface.

10. The device according to claim 5, wherein said first set-back internal central surface co-operates with a first ejector comprising first supporting elements, said first ejector being mounted on a first elastic return means exerting a thrust on said first ejector such that said first supporting elements of the first ejector are able to be maintained in front of said first central surface by said first elastic return means in said opening position and said first supporting elements of the first ejector are able to be brought back to a level of said first set-back central surface when they are bearing against the pod in said closing position.

11. The device according to claim 10, wherein said first supporting elements are upper and lower branches extending radially and angularly positioned according to a shape and arrangement, wherein two side lower branches are positioned at 120° with respect to an middle upper branch, such that:
in said opening position, upon inserting said pod into said insertion compartment, said pod will first of all only abut against said upper branch without coming into contact with said lower branches, said upper branch guiding fall of the pod against said rear peripheral surface of said third part, and
in said opening position, when the front face of the convex peripheral portion of the pastille filled with powder from said pod is bearing against said rear peripheral surface of said third part, in a tilted position in said insertion compartment, the rear face of said pod is in contact with the lower portion of said non-cylindrical peripheral surface of the front face of said first part but without any contact with either said upper branch or said lower branches.

12. The device according to claim 5, wherein said second set-back internal central surface comprises or cooperates with a second ejector comprising second supporting elements, said second ejector being mounted on second elastic return means exerting a thrust on said second ejector such that said second supporting elements of the second ejector in an extension position, are able to be maintained in front of said second central surface and/or said second perforated plate by said second elastic return means in said opening position and said second supporting elements of the second ejector are able to be brought back to a level of said second set-back central surface when said second supporting elements are bearing against the pod in said closing position.

13. The device according to claim 12, wherein said second ejector comprises a front portion in an elastomeric material, mounted on a stiff rod able to cooperate with said second elastic return means, said front portion of the second ejector comprising a head forming said second supporting elements in an elastomeric material, the rear face of which is of a frusto-conical shape able to sealably close the central aperture of said front portion of said second part when said second ejector slides therein as far as in withdrawal position, and said rear face of the front portion of the second ejector comprises junction means (2d-6) ensuring the junction between said second supporting elements with the rear face of said front portion of said second part, said junction means in an elastomeric material being able to sealably close the central aperture of said front portion of said second part, said second ejector when said second ejector slides therein as far as in said extension position.

14. The device according to claim 1, wherein, in said insertion position, said insertion compartment comprises an open space forming a slot between a lower portion of the rear face of said third part and a lower portion of the front face of said first part, said slot being able to be crossed by a flange of the pod when the pod is inserted into said insertion compartment.

15. The device according to claim 4, wherein:
said orifice of said third part is delimited by a rear peripheral surface, the upper portion of which has an oblong half-circumference able to continuously support the upper portion of said flange and a lower portion of which has a semicircular lower half-circumference able to continuously support a lower portion of the front face of the convex solid portion of said pastille when said pod is in the insertion compartment in said opening position, said orifice being bordered by two side edges capable of actually maintaining said flange coaxially with said longitudinal axis (XX') at least between said upper and lower portions of said rear peripheral surface delimiting said orifice.

16. The device according to claim 1, wherein said position of maximum tilt is an angle from 10 to 30° with respect to said transverse vertical plane.

\* \* \* \* \*